(12) United States Patent
Coleman et al.

(10) Patent No.: US 10,685,494 B2
(45) Date of Patent: Jun. 16, 2020

(54) WEARABLE DISPLAY FOR USE WITH TOOL

(71) Applicant: JPW Industries Inc., Lavergne, TN (US)

(72) Inventors: Micah Coleman, Nashville, TN (US); Charles Weber, Onalaska, WI (US)

(73) Assignee: JPW Industries Inc., Lavergne, TN (US)

( * ) Notice: Subject to any disclaimer, the term of this patent is extended or adjusted under 35 U.S.C. 154(b) by 0 days.

(21) Appl. No.: 15/939,358

(22) Filed: Mar. 29, 2018

(65) Prior Publication Data
US 2018/0218544 A1    Aug. 2, 2018

Related U.S. Application Data

(63) Continuation of application No. 15/131,107, filed on Apr. 18, 2016, now Pat. No. 9,972,133.
(Continued)

(51) Int. Cl.
*G06T 19/00* (2011.01)
*B23D 59/00* (2006.01)
(Continued)

(52) U.S. Cl.
CPC ............ *G06T 19/006* (2013.01); *B23D 59/00* (2013.01); *G02B 27/017* (2013.01);
(Continued)

(58) Field of Classification Search
None
See application file for complete search history.

(56) References Cited

U.S. PATENT DOCUMENTS

2002/0017178 A1* 2/2002 Gass ............... B23D 47/08
                                                    83/58
2006/0106482 A1  5/2006 Etter et al.
(Continued)

FOREIGN PATENT DOCUMENTS

DE    102012217573 A1    3/2014
EP       2380709 A2    10/2011
(Continued)

OTHER PUBLICATIONS

Christian Vogel et al: "Towards safe physical human-robot collaboration: A projection-based safety system", 2011 IEEE/RSJ International Conference on Intelligent Robots and Systems, (Sep. 25, 2011), pp. 3355-3360.
(Continued)

*Primary Examiner* — Ke Xiao
*Assistant Examiner* — Jed-Justin Imperial
(74) *Attorney, Agent, or Firm* — Waller Lansden Dortch & Davis, LLP; Blake M. Bernard

(57) ABSTRACT

A wearable augmented reality overlay device for use with a tool displays information to a user relating to the status or operation of the tool, to the forming of a work piece for a project, or to safety information related to the tool. The displayed information may include a highlight projected onto a portion of the tool, onto a wearer's body part, or onto a work piece. The displayed information may include a virtual control for the tool or another tool, an operating manual, or a maintenance, assembly or operating guide. The wearable display permits the user to control the tool and potentially other tools in the work shop. The display may instead include a projector to project adjustment information as a tool is adjusted. A virtual image of a tool may be projected to locating a tool in a work area.

19 Claims, 12 Drawing Sheets

Related U.S. Application Data

(60) Provisional application No. 62/152,487, filed on Apr. 24, 2015.

(51) Int. Cl.
  *G02B 27/01* (2006.01)
  *G05B 19/409* (2006.01)
  *G06F 3/01* (2006.01)

(52) U.S. Cl.
  CPC .......... *G05B 19/409* (2013.01); *G06F 3/011* (2013.01); *G02B 27/0176* (2013.01); *G02B 2027/0178* (2013.01); *G05B 2219/32014* (2013.01)

(56) References Cited

U.S. PATENT DOCUMENTS

| | | |
|---|---|---|
| 2006/0241792 A1 | 10/2006 | Pretlove et al. |
| 2011/0179624 A1 | 7/2011 | Sexton |
| 2012/0259973 A1 | 10/2012 | Windell |
| 2014/0168266 A1 | 6/2014 | Kimura |
| 2014/0285522 A1 | 9/2014 | Kim et al. |
| 2015/0248826 A1 | 9/2015 | Hahn et al. |

FOREIGN PATENT DOCUMENTS

| | | |
|---|---|---|
| JP | 2010144773 A | 7/2010 |
| WO | 2007066166 A1 | 6/2007 |

OTHER PUBLICATIONS

Search Report and Written Opinion from European Patent Office; dated Aug. 10, 2016, 26 pages.

Office Action from European Patent Office; dated Feb. 28, 2019, 5 pages.

\* cited by examiner

WEARABLE DISPLAY FOR USE WITH TOOL

CROSS REFERENCE TO RELATED APPLICATION

The present application is a continuation of and claims the benefit of U.S. patent application Ser. No. 15/131,107 filed Apr. 18, 2016 entitled "Wearable Display For Use with a Tool", which claims the benefit of U.S. Provisional Patent Application Ser. No. 62/152,487, filed Apr. 24, 2015, each of which is incorporated herein by reference.

BACKGROUND OF THE INVENTION

Field of the Invention

The present invention relates generally to image projection device for use with a tool, and more particularly, to a wearable image projection device or a projector device for use with a tool.

Description of the Related Art

Workers in a machine tool shop, crafts persons, home hobbyists, and others use tools such as power tools to perform work on work pieces. Work is often interrupted to check instruction sheets and diagrams for proper operation of the tools. Work is also interrupted while other tools, such as dust collectors, are turned on or controlled. Set up and operation of the tool may require that the user halt the set up process or operation of the tool to check settings or other information.

SUMMARY OF THE INVENTION

The present invention provides an image projection device such as wearable image projection device or augmented reality overlay device for use with a tool or in a shop, such as a machine tool shop, home hobbyist's shop, crafts person's shop, or other location. A wearable image projection device or a projector is provided for projecting image information for viewing by a user while working with a tool or while working in a shop. A wearable image projection device or display, also referred to as a heads up display, may provide information for view by the user while the user is working with the tool or in the shop.

The wearable display device or projector device may project information about the tool or about other tools in the shop. For example, the user may view a user guide or diagram of the tool or be directed to a part or control. The user may be provided with information relating to controls or adjustments for the tool that are viewed via a projected image by the image projection device. The control or adjustment information is visible to the user while the user is viewing the tool, such as the part of the tool being adjusted.

In another application, the user is provided with an image by an image projection device that that illustrates the progress steps in completing the project or in shaping the work piece. A projection of a finished work piece is projected by the heads up display or by the projector for the user to see. In this way, the user may view the finished work piece, or intermediate steps in the preparation of the work piece, projected onto the work piece. For example, a user seeking to cut a piece of wood to a particular shape or size for a project sees the shape of the cut and shaped wood overlaid on the uncut and unshaped wood. The user may view either the individual parts or the completed project, for example, a completed chair or cabinet, via the wearable display and may see how various parts fit into the completed project. The parts and/or project may be viewed prior to beginning work on the project and/or while performing work on the pieces that will be used to build the completed project. Viewing other projects and work pieces are of course possible.

The wearable display or projector may overlay a highlight on the part being worked. For example, a red highlight may be overlaid on the work piece as the user performs the work. Areas where material is to be removed are highlighted. The highlight disappears from the overlay where the material has been removed to the desired extent. For example, a user may cut away all the red (or other color) highlighted areas to leave the desired shape of the finished product. As the work piece nears the desired shape, only spots or areas remain that are highlighted. The user removes the highlighted spots or areas so that the work piece is in the desired shape.

The highlighting of material to be removed may be provided with any number of tools. For example, a work piece being shaped by a lathe or band saw may be viewed in the wearable display to show highlighted material to be removed. A length of material to be cut shorter by a saw, for example, may have the portion to be removed highlighted.

The wearable display or projector may be used to view the status of machines and tools in the shop and/or to control the machines or tools. For example, the user may be using a sanding tool on a work piece and may desire to activate or adjust a dust collector. The wearable display is capable of displaying the operating status of the dust collector and enables the user to activate or control the dust collector. The control of the sander may be performed via the wearable display or by some other control. Controls for some or all of the tools in the shop may be viewed and/or adjusted using the wearable display.

The control of the tool or of other tools in the shop may be accomplished by virtual controls that are operated by the user. For example, a virtual button, key pad, dial or knob may be displayed on the wearable display or projector. The user manipulates the virtual controller, such as by pushing the virtual button, to control the tool or other devices in the shop. The wearable display may show a virtual control panel of the tool for manipulation/operation by the user. The user interacts with the virtual controls to perform a control operation on the tool.

The wearable display or projector may be used to access technical support to assist the user in the operation and/or installation of a tool. For example, the wearable display may display an installation guide or assembly diagram for the tool. The wearable display may be activated by a technical support function such as by access to installation and operation information and/or by access to technical support systems or personnel that provide guidance to the user via the wearable display.

The wearable display or projector may sense the location of a work piece and/or the location of a tool and/or the location of the user and, based on the sensed location, may control operation of the tool. For example, the wearable display may sense a location of the user's hands as the user is operating a tool. The wearable display may send control signals to the tool based on the sensed location. In one example, if the user's hand is near (within a predetermined zone or distance) a cutting or shaping tool, for example, the tool operation may be halted.

The wearable display or projector may sense a user's hand or other body part near a blade or other tool part. When the user's hand is near the blade, for example, the user's hand may be highlighted in a warning color, or the area between the hand and the blade may be highlighted with a warning. For example, a wearer's hands may be highlighted in green when at a safe position. The highlight may change to red when the user's hands are moved to a less safe position. When the hands are even closer to the blade, the highlight may change to a flashing display. And finally when the hands are very close to the blade, the wearable display halts the operation of the tool or takes some action to prevent or reduce injury.

In one example, the wearable display or projector projects an outline of the user's hands onto the user's hands in a first color, such as green, and projects an outline of the blade or other cutting part onto the blade in, for example red. The color and effect (flashing, not flashing) of the display may change if the user moves his or her hand too close to the blade.

The wearable display may be provided as safety glasses, as a face or eye shield, or other wearable display device. An example of a wearable display is the Google Glass head-mounted display. Other examples of a display include the Leap Motion display device, the Microsoft Holo Lens holographic display, or the Epson projector glasses.

A CAD (computer aided design) illustration of a tool may be projected onto the tool using the wearable display or projector. Controls and other features of the tool may be highlighted as information is provided to the user about use of the tool, repair of the tool, adjustment of the tool, or some other aspect.

The wearable display or projector and the tool may be paired to provide communication between the tool and the wearable display or projector. The pairing of the devices may be specific to the brand and/or communication protocol of the tool. In alternate embodiments, the wearable display may operate with any tool regardless of brand or communication protocol. For example, the wearable display or projector may sense a tool part having a particular moving speed or motion and may determine that the sensed moving part is the tool blade, for example. The wearable display may highlight the blade or other part in, for example red, and highlight the user's hands in green, for example. The wearable display or projector may operate with any tool that has moving parts, and is not machine specific. The wearable device or projector may provide warnings to the user when the user's hand is too close.

In certain embodiments, a wearable display or projector is provided with digital read out (DRO) information from a tool or machine. Machine settings, speed, blade type, and other information may be provided to the user via the wearable display. The tool may be provided with a transmitter that transmits the machine settings and other information to the wearable display either by being provided in the tool or by being added to the tool. For example, the tool may be provided with an output, such as a USB connector, to which is connected a dongle or other device that wirelessly transmits the digital read out information via a Bluetooth connection to glasses or other wearable display. The digital read out information may be provided by the dongle to a smart phone app, such as an Android or Apple app, running on a smart phone or other device. The app formats the incoming digital read out information from the tool for display on the glasses or other wearable display. The digital read out information may be sent to any wireless receiver for transfer to the wearable display.

The wearable display may be safety glasses, a face shield or mask, or over-glasses. The wearable display may show the virtual display to the use via a single eye or by both eyes.

In alternative embodiments, an image projector, such as a laser image projector, is provided. A projection of an image is provided onto the tool and/or work piece. For example, the digital read out information (tool speed, settings, and the like) are projected onto the work area and/or onto the work piece. A work piece to be shaped may have portions to be removed highlighted by the projection. The user need only remove the highlighted areas. Warnings, such as proximity to the blade warnings, tool operation warnings, or other warnings, may be projected onto the work area and/or work piece. Such warnings may be provided where there is a wearable display available and may be projected onto the work piece where no wearable display is available.

The projection of image information and other information onto the work piece may be provided by a laser projector or other type of projector.

The position of the user's hands may be sensed to control operation of the tool. For example, when the user's hands leave the field of view of the wearable display, the tool may be stopped. When the user's hands return to the field of view, the machine is started. Other controls are also possible by the sensing of the user's hands. For example, a virtual button in space may be operated by the user to control the tool. Sound waves may be projected to provide a tactile sense to the user when operating the virtual control.

The projected information, including the projected or virtual display of the digital read out (DRO) information, the projected highlights, or the virtual display of the highlights by the wearable display, permit the user to view the control information and to control the tool without taking the user's eyes off the work piece and the cutting head or blade.

Augmented display of information and controls to the user provides the possibility of safer operation of the tool, better quality work, less wasted material, fewer errors, and less wasted time.

Control of the tool via the wearable display and/or projected display may be performed by voice commands.

DETAILED DESCRIPTION OF THE PREFERRED EMBODIMENTS

The apparatus for providing information to the user may be referred to as a wearable display, a projector, a wearable image projection device, an augmented reality overlay device, wearable projection glasses, projector glasses, laser projector, image projection device, heads-up display, and other terms. These and other terms may be used interchangeably and do not limit the scope of the invention.

Figure 1:
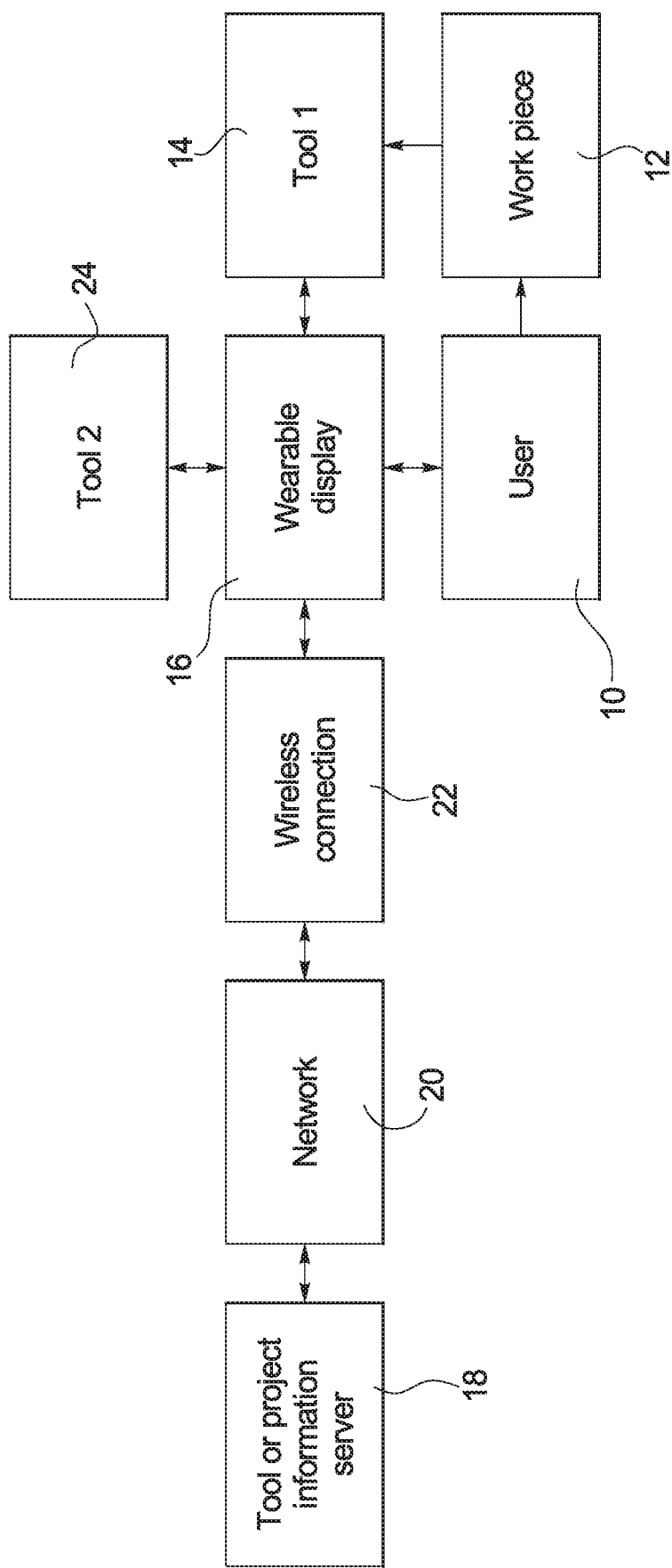
FIG. 1 is a schematic diagram of a user using a tool to work on a work piece and interacting with the tool using a wearable display.

In FIG. 1, a user 10 is shaping, forming, cutting, abrading, or otherwise working on a work piece 12 using a tool 14. The user 10 is wearing a wearable display 16. The wearable display 16 is connected to a tool or project information server 18 via a network 20 and a wireless connection 22. The network 20 may be the internet and the wireless connection 22 may be a local Wi-Fi connection by which the wearable display 16 communicates with the server 18. The wearable display 16 may show the tool 14 to the user, may illustrate its operation and/or controls, may illustrate its installation and/or assembly, or may provide safety information or other information regarding the tool 14. The wearable display 16 may show the user 10 a completed work piece or intermediate steps in the shaping, forming or other working of the work piece 12. The user 10 may use the tool 14 to shape or otherwise work the work piece 12.

The user 10 may interact with the wearable display 16 to control the operation of the tool 14. For example, the user 10 may use the wearable display 16 to start and/or stop the tool 14, adjust a speed or setting, or otherwise change some operating condition of the tool 14. The wearable display may sense the user's position relative to the tool 14, such as whether some part of the user 10 is near a blade or other cutting part of the tool 14. The wearable display 16 may stop the operation of the tool 14 or otherwise change the operation of the tool 14 to protect the user from contact with the cutting part. The wearable display 16 may display a warning to the user to avoid placing the user's hands, for example, at the sensed position.

The wearable display 16 may be connected with a second tool 24, such as another tool in a work shop. The second tool 24 may be operatively connected to the first tool 14, such as by a dust collecting hose or other connection. In one example, the first tool 14 is a sander, saw, planer, drill, mill, or other shaping or forming tool that generates particulates, saw dust, or other material. The second tool 24 is a dust collector that is connected to collect the particulates, saw dust, or other material. The user 10 may view the operating status of the second tool 24 on the wearable display 16 and may control the second tool 24 while continuing to use the first tool 14 to shape or form the work piece 12.

The wearable display 16 may be worn by the user 10 while assembling the tool 14, while connecting the tool 14 to the second tool 24, or while learning to operate the tool 14. The wearable display 16 may illustrate trouble shooting information for the user when the user experiences problems operating the tool 14. For example, a technical support person may cause the wearable display 16 to show the user a control or part of the tool for examination, testing, or operation.

The wearable display 16 may show diagrams, text, numbers, video data, or other data. The wearable display 16 may in include one or more sensors to sense a user's head position, viewing direction, or other user information. The wearable display 16 may sense the space around the user 10, including the position of the tool, the position of the work piece, the position of the user's hands or other body parts. The wearable display 16 may sense a position of articles of clothing worn by the user 10, such as a sleeve, that may get caught in the tool 14.

In an alternate embodiment, a projector, such as a laser projector, is provided to project information including operating information and image information onto a work area and/or work piece.

Figure 2:
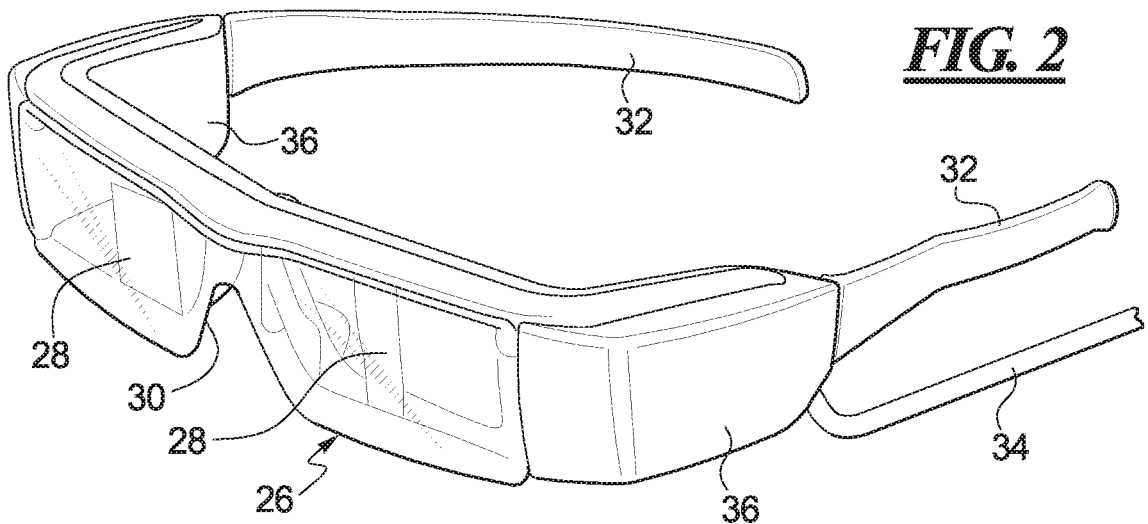
FIG. 2 is a perspective view of a virtual reality device or image projection device for use with the present method and apparatus.

FIG. 2 shows a wearable image projection device 26, also described as an augmented reality overlay device, in the form of glasses. The augmented reality overlay device 26 may also be termed a virtual reality device or more accurately an augmented reality overlay device. The device 26 projects image information onto a viewing screen 28 that is positioned in from of one or both eyes of a wearer. The projected image information is seen by the wearer as overlaid on or projected onto real objects that the user is viewing through the glasses 26. The projected information may be information in a fixed position relative to the screen or display 28. This screen fixed position information that remains in a particular position in the view of the wearer regardless of where the wearer is looking while wearing the projection device. The screen fixed position information may be provided to the wearer without the need for feedback on the position or orientation of the wearable image projection device.

The projected information may also or instead include projected information that is fixed in position relative to an object in the view of the wearer. The image projection device senses one or more objects in the field of view of the wearer and overlays a projected image onto the object or a portion of the object. The projected information is maintained in the position on the object in the wearer's view as the wearer views the object from different angles and distances. The projected image appears to the wearer to be fixed on the object as the wearer moves the wearer's head, for example.

The present method and apparatus encompasses an image projection apparatus that projects an image onto the object or a portion of the object but which may not overlay the projected image onto the object from every angle and every distance or for every view of the object.

The augmented reality overlay device may be provided in safety glasses so as to project the wearer's eyes during use of the tool. The device may instead be a face shield, visor, a helmet window such as on a haz-mat (hazardous materials) suit, a contact lens worn in the eye, an implanted image display device, a viewing window to a room or area, a transparent safety shield mounted, for example, on the tool, or other device for providing a projected image onto a view of the tool. As will be discussed in greater detail herein, the image projection device may be a projector that projects image information directly onto the tool and/or onto a work piece and/or onto the user or onto other areas. For example, a laser projector may be provided to project information, including overlay information, as needed.

As can be seen in FIG. 2, the augmented reality overlay device 26 is in the shape of glasses having a transparent or semi-transparent view screen 28 for positioning over one or both eyes of a wearer. The view screen 28 is shaped at 30 to accommodate the bridge of the wearer's nose. Earpieces 32 are provided to engage onto the sides of the wearer's head, such as over the ears of the wearer. An extension 34 is provided extending from one of the earpieces 32. The extension 34 may be a cord for wired operation of the device 26. The extension 34, which may be repositionable by the user, may include a voice input microphone for receiving voice commands from the wearer. The extension 34 may instead or in addition include an antenna for wireless communication.

The device 26 includes housings 36 on both sides of the view screen 28 at the earpieces 32. The housings 36 incorporate an image projection device, a wireless communication system, a power supply, and may include sensors for detecting objects in the field of view of the wearer, as well as orientation and motion sensing devices. In certain embodiments, the augmented reality overlay device 26 includes a Wi-Fi or Bluetooth wireless communication device, a video camera with shape recognition capability for sensing objects in the view of the wearer, and motion and position sensors that may include gyroscopic sensors, also referred to as angle rate sensors or angular velocity sensors. The gyroscopic sensors may include vibration gyro sensors, although other technologies such as fluid gyros, fiber-optic gyros or ring laser gyros may be used.

Figure 3:
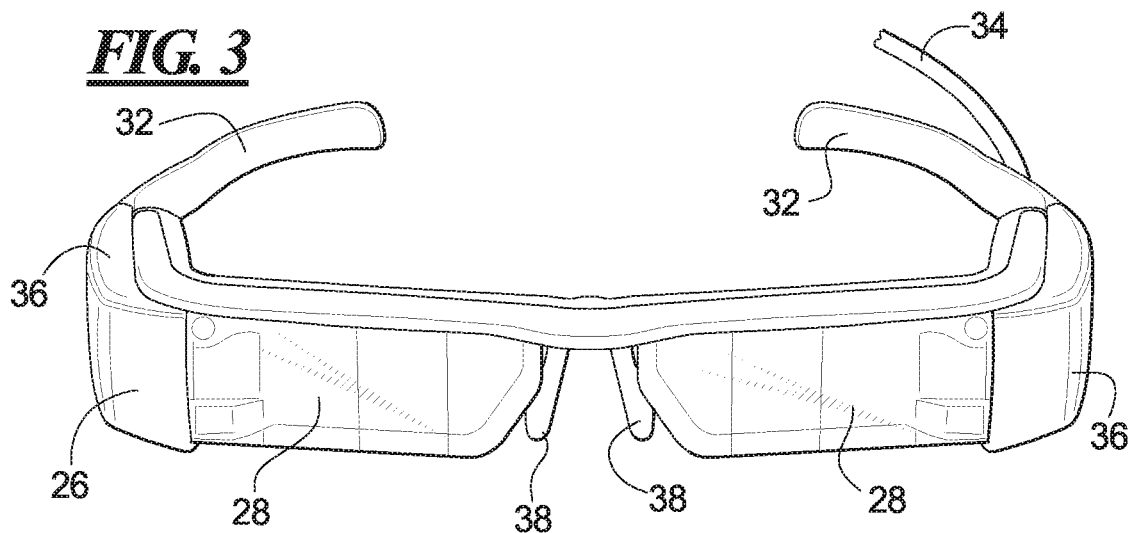
FIG. 3 is a front isometric view of the virtual reality device of FIG. 2.

In FIG. 3, the augmented reality overlay device 26 includes nose pieces 38 for contact with the bridge of the wearer's nose and the housings 36 on either side of the wearer's head to enable the augmented reality overlay device 26 to reconstruct the physical world around the wearer and determine the position of objects in space. The view screens 28 permit the wearer to view the area around the wearer while providing projected overlay images that appear in the view as if the projected image were part of the physical world. The wearer is able to view both the physical world and the virtual projected image information at the same time. Such projection display devices may be known as heads-up displays. The augmented reality overlay device 26 is of a size and shape to be comfortably worn by the wearer without interfering with the wear's view of the physical world and without interfering with the wearer's use of objects in the physical world, such as use of the tool and handling of a work piece.

Figure 4:
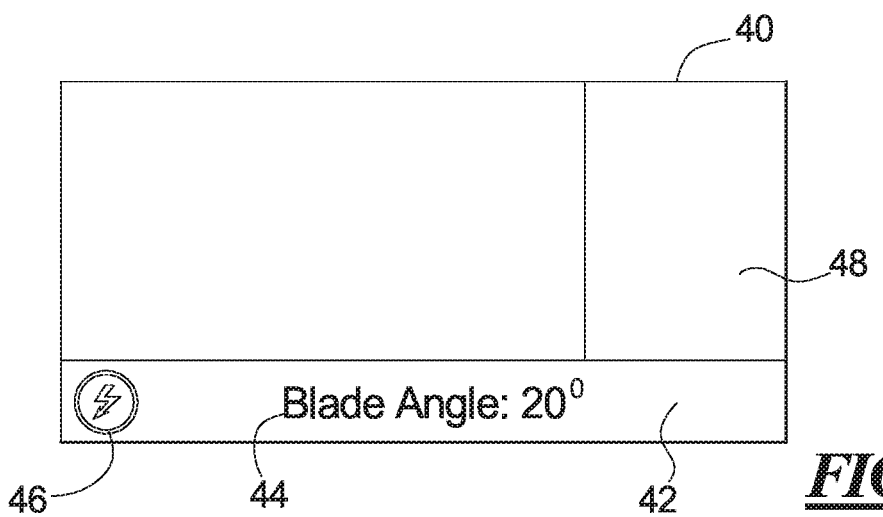
FIG. 4 is a screen shot of a of a virtual reality device according to the present method showing information display areas.

In FIG. 4, a view screen 40 of the augmented reality overlay device 26 is shown. The view screen 40 is seen as if the wearer were looking at a blank wall, for example, without objects in the physical world appearing in the view through the semi-transparent screen. The view screen 40 includes a lower band 42 extending across the lower portion of the screen 40. The lower band 42 displays machine feedback information 44 of the tool in this example. In the illustrated example, the machine feedback information display 44 includes text in the lower band 42, here reading "blade angle: 20°." Information for the machine feedback information display may be obtained from sensors in the tool. The machine feedback information display 44 can be turned on or turned off, for example by the wearer or automatically. The displayed machine feedback information 44 may be selected from various information items that may be available. The available information may depend on the type of machine or tool, and may include tool or accessory settings, operating speed, position or angle information, or any other information that may be available.

At the far left in the lower band is an icon 46 indicating a machine power status. The machine status indicator 46 may include an indication that no power is provided to the tool, that power is provided to the tool, that the tool is running, or that an emergency stop has been triggered. Other indications are also possible.

To the right of the view screen 40, shown extending along the right hand edge, is an information window 48. The information window 48 may be turned on or turned off, for example by the wearer or automatically. Possible information that may be projected at the information window 48 may include a view of a completed model, or completed work project or completed work piece or part, or an intermediate step of the work project or work piece. The information window 48 may display an operating manual for the tool, or other operating information relative to the tool. The information window 48 may display technical service instructions, safety information or the like. Display of other information is also possible.

The information 44 displayed on the view screen 40 and the position of the information 44 may vary from that shown without departing from the present invention.

Figure 5:
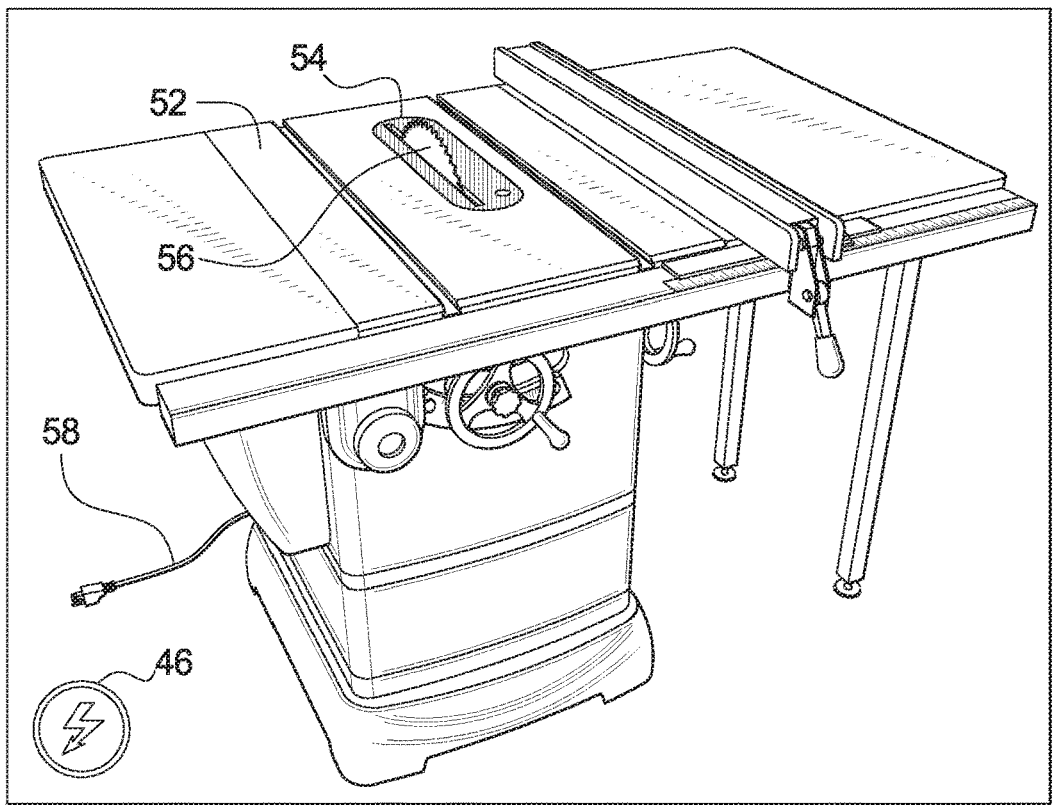
FIG. 5 is a view via the virtual reality device of a tool with projected image information showing the power status of the tool and indicating a blade area.

Turning to FIG. 5, the view 50 through the view screen 40 of the augmented reality overlay device 26 shows the physical world before the wearer. The wearer is looking at the tool 52, here a table saw. The tool 52 is clearly seen in the wearer's view through the augmented reality overlay device 26. In addition to the tool 52 and the environment around the tool 52, the wearer is able to see the machine power status icon 46 in the lower left corner. Here, the icon 46 indicates that no power is being supplied to the tool 52. The power status icon 46 is fixed in position relative to the screen 40 and remains in the left corner of the field of view 50, in this example, no matter the direction of the wearer's view. The power status information is wirelessly communicated from the tool to the augmented reality overlay device or may be communicated by wired communication.

Also in FIG. 5 is a view 50 of the tool 52 with an area 54 around the blade 56 indicated in a color, such as in red or other readily noticeable color. The tool 52 may have the highlight color area on the physical tool, for example as provided by a color insert into the top portion 62 around the blade opening in the table of the saw 52. In addition or alternately, the augmented reality overlay device 26 may be programmed to generate a highlight area 54 around the blade 56 in the view 50 as an area of interest or caution. For example, the highlight area 54 may be generated by the device 26 sensing the movement of the blade 56 and generating a caution zone 54 around the moving blade, or as a result of recognizing the tool 52 as a table saw and particularly this model or type of table saw and locating the highlighted zone 54 at the blade 56. Other means and methods for generating the highlighted area or zone 54 are also possible and within the scope of this invention.

Where a projected highlight 54 is provided in the view 50 through the device 26, the blade 56 of the table saw 52 and an area around the blade 56 are highlighted. Although any image or color may be projected, the area around the blade 56 is highlighted in red in this example. Other colors may be used instead. Other areas of the tool 52 may be highlighted. Other tools and, in particular, other types of tools may have other parts highlighted. Here, the highlight area 54 provides user awareness of the cutting portion of the tool 52. The highlight area 54 may be provided as a safety feature. The blade highlight 54 remains in position over the blade 56 of the tool 52 as the wearer moves and the view of the physical world moves in the view 50 of the augmented reality overlay device 26. The blade highlight area 54 moves in the field of view 50 as the position of the tool 52 moves in the field of view 50. For example, if the wearer turned his or her head so that the tool 52 moves to the left or up in the view 50, the blade highlight 54 moves to the left or up in the view, remaining in place on the blade 56 of the tool 52. The blade highlight zone 54 may be considered fixed to the object (the tool).

Portions of the tool 52 may be highlighted for safety, for instruction in the use of the tool, for guidance in assembly of the tool, or for other reasons. Similarly, the work piece may be highlighted, or a portion of the work piece or other objects may be highlighted, such as the user's hands.

Figure 6:
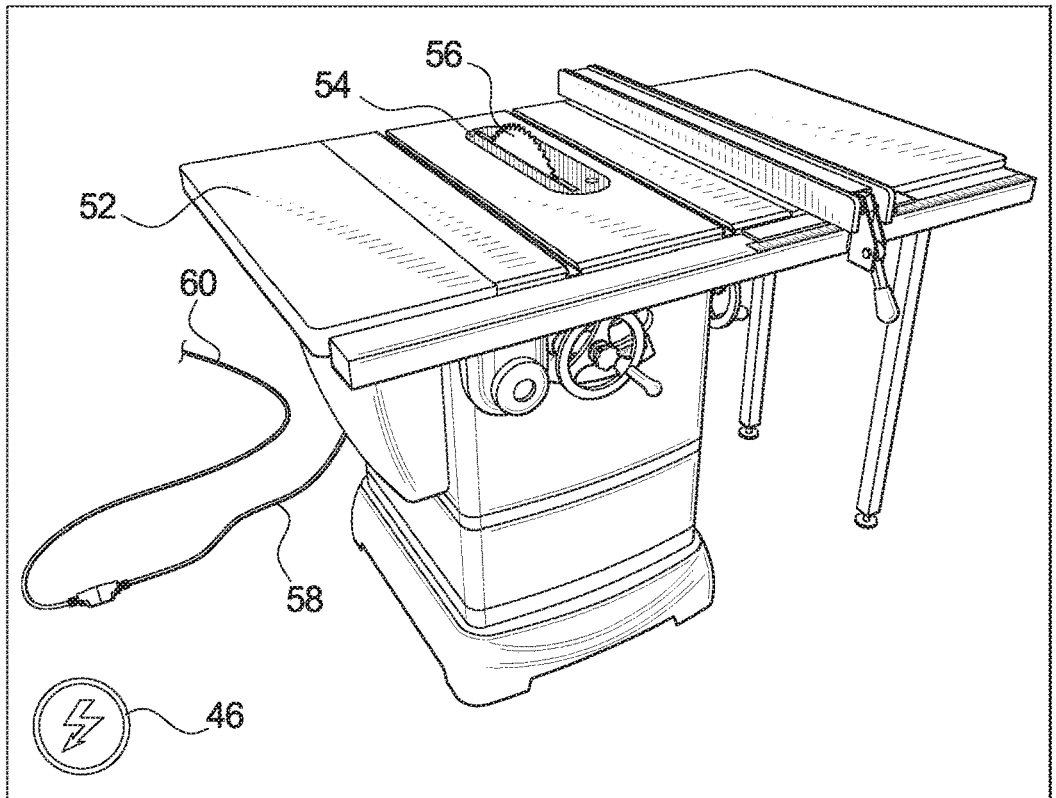
FIG. 6 is a view via the virtual reality device of a tool with projected image information showing a change in the power status of the tool and indicating the blade area.

FIG. 6 shows the view 50 through the augmented reality overlay device 26 including the wearer's view of the tool 52 and the blade highlight 54. The power status icon 46 has changed in appearance to indicate that power has been provided to the tool 52. For example, the power status icon 46 is changed from an all-white power symbol to a light green power symbol. Other colors or symbols may be provided as desired. In the view of FIG. 6, an electric cord 58 can be seen connected to an extension power cord 60 that supplies power to the tool 52. In FIG. 5, the electric cord 58 for the tool 52 is disconnected. The user of the tool 52 may not have noticed whether the cord is connected or not, but is provided with the power information in the view 50 provided by the augmented reality overlay device 26.

Figure 7:
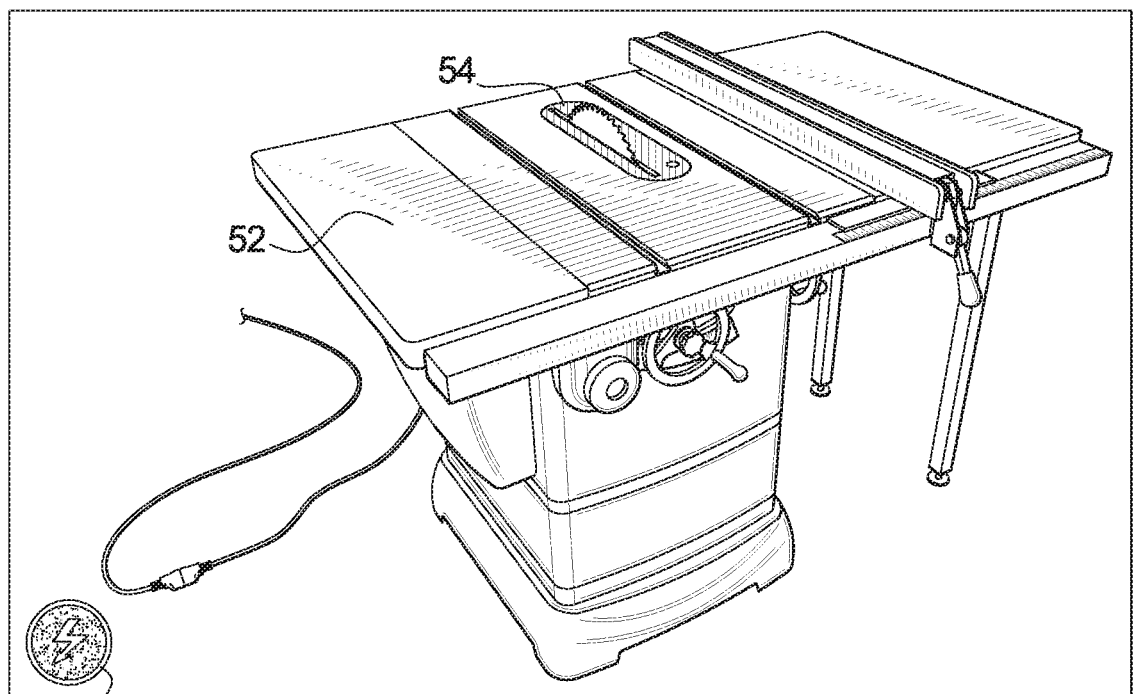
FIG. 7 is a view via the virtual reality device of a tool with projected image information showing another change in the power status of the tool and indicating the blade area.

FIG. 7 shows the same tool 52 with the blade highlight zone 54 in red. The power status icon 46 is changed to another color, here a dark green color, for example, indicating that the tool 52 has been turned on. This indicates that the motor of the table saw 52 is running and the blade 56 is turning. Other indicators may be provided for the tool status as desired.

Figure 8:
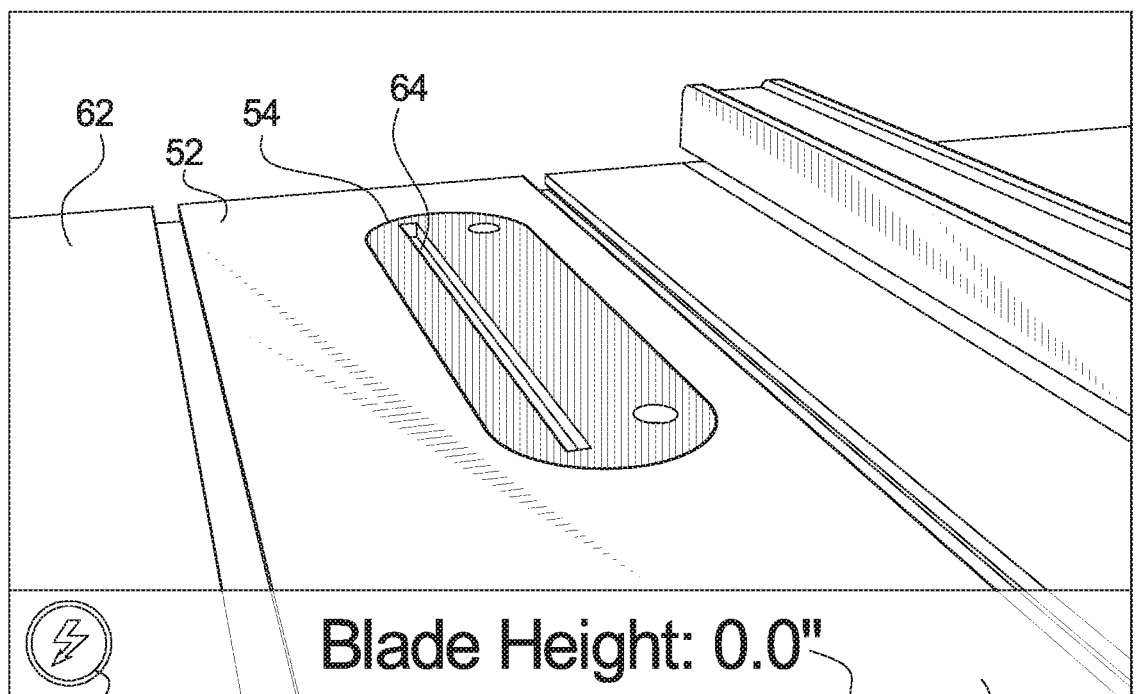
FIG. 8 is a view via the virtual reality device of a tool with projected image information showing a blade height setting of the tool and indicating a blade area.

In FIG. 8, the wearer has moved closer to the tool 52 so that only the top portion 62 of the table of the table saw is seen in the view 50 through the augmented reality overlay device 26. The blade area 54 may remain highlighted in the view. The slot 64 through which the blade 56 may extend is visible within the highlighted blade area 54. The wearer has turned on the machine feedback information display 44 in the band 42 across the lower portion of the view 50. The machine feedback information display 44 appears as the shaded band 42 as text in the band. The wearer selects the information to be displayed in the band 42. Here, the wearer has selected blade height as the information to be displayed. The tool 52 wirelessly or via wired connection communicates with the augmented reality overlay device 26 to display the information that the blade height is set to zero (0.0 inches), as sensed by a sensor in the tool 52. No blade is visible at the blade opening or slot 64 in the top portion 62 since the blade 56 is below the surface of the top portion 62. The power status icon 46 is all white, indicating that the tool 52 is disconnected from power. In the example, the power icon 46 may indicate whether power is connected to power the motor that drives the blade 56. Power may be provided separately to sensors or the like in the tool 52 so that the tool settings may be sensed and communicated to the augmented reality overlay device 26 even when power is not connected to the motor. For instance, a separate power supply or battery may provide power to the sensors.

Figure 9:
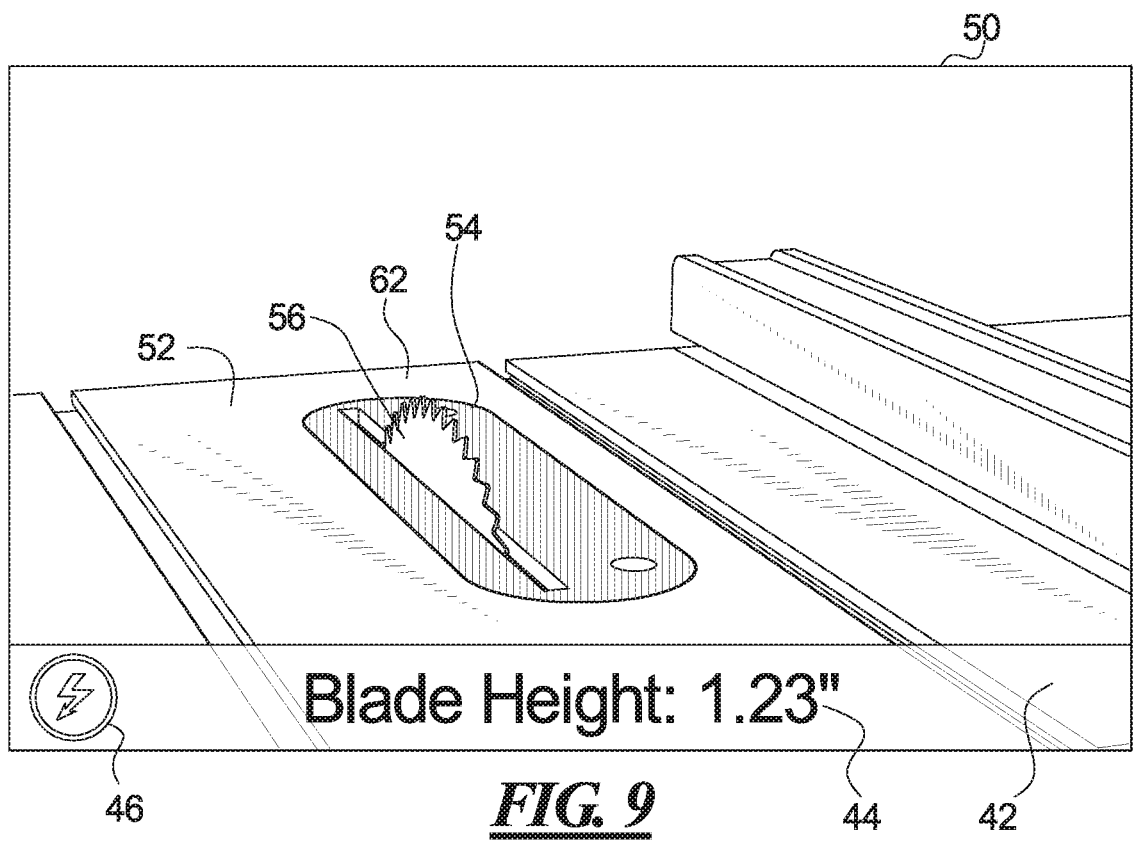
FIG. 9 is a view via the virtual reality device of a tool with projected image information showing a change in the blade height setting of the tool and indicating the blade area.

With reference to FIG. 9, the user has adjusted the tool 52 to extend the blade 56 through the blade opening 64. The adjusted position of the blade 56 is reported in the band 44 across the wearer's view 50, indicating here that the blade 56 is at a height of 1.23 inches above the top portion 62 of the table. The blade 56 is visible to the wearer through the augmented reality overlay device 26. The area 54 around the blade 56 may be highlighted with a transparent highlight, which is red in this example, to indicate that the user should use caution in the area 54 around the blade 56, as the blade 56 may present a risk of injury to the wearer. The transparent highlighted area 54 permits the user to see the blade 56 through the highlighted area, without obscuring the view of the blade 56.

Figure 10:
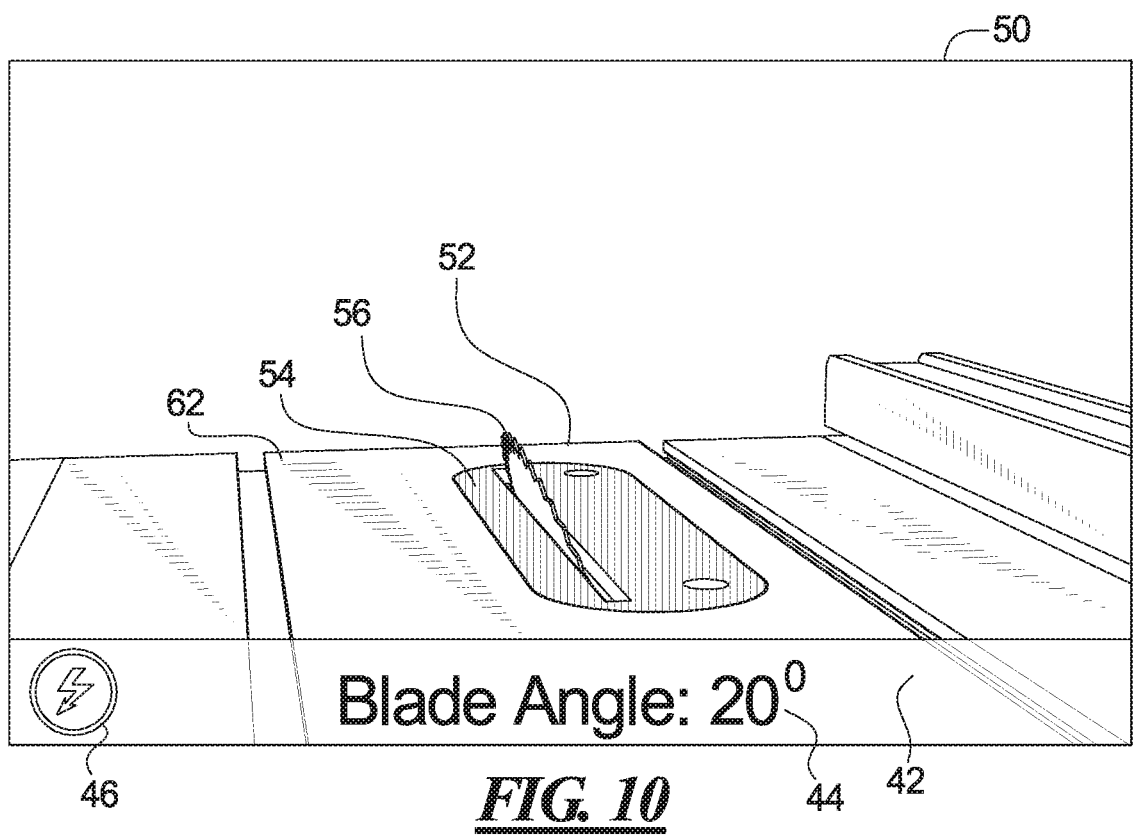
FIG. 10 is a view via the virtual reality device of a tool with projected image information showing a blade angle setting of the tool and indicating the blade area.

In FIG. 10, the wearer has moved positions relative to the tool 52, which has caused the highlighted area 54 to be reoriented in the view 50, following the position and orientation of the area around the blade 56 that is visible through the device 26. The wearer has selected the blade angle as information 44 to be displayed in the shaded band 42 at the lower portion of the display 50. The wearer has adjusted the tool 52 to change the angle of the blade 56 relative to the top portion 62, and the resulting angle is displayed as "blade angle: 20°" in the machine information display 44. The angle of the blade 56 is determined by sensors and transmitted to the device 26. The power icon 46 continues to indicate that no power is provided to the motor of the tool 52. Other settings for this tool 52 as well as settings for other tools may be displayed on the augmented reality overlay device 26, either as a result of user selection or automatically.

Figure 11:
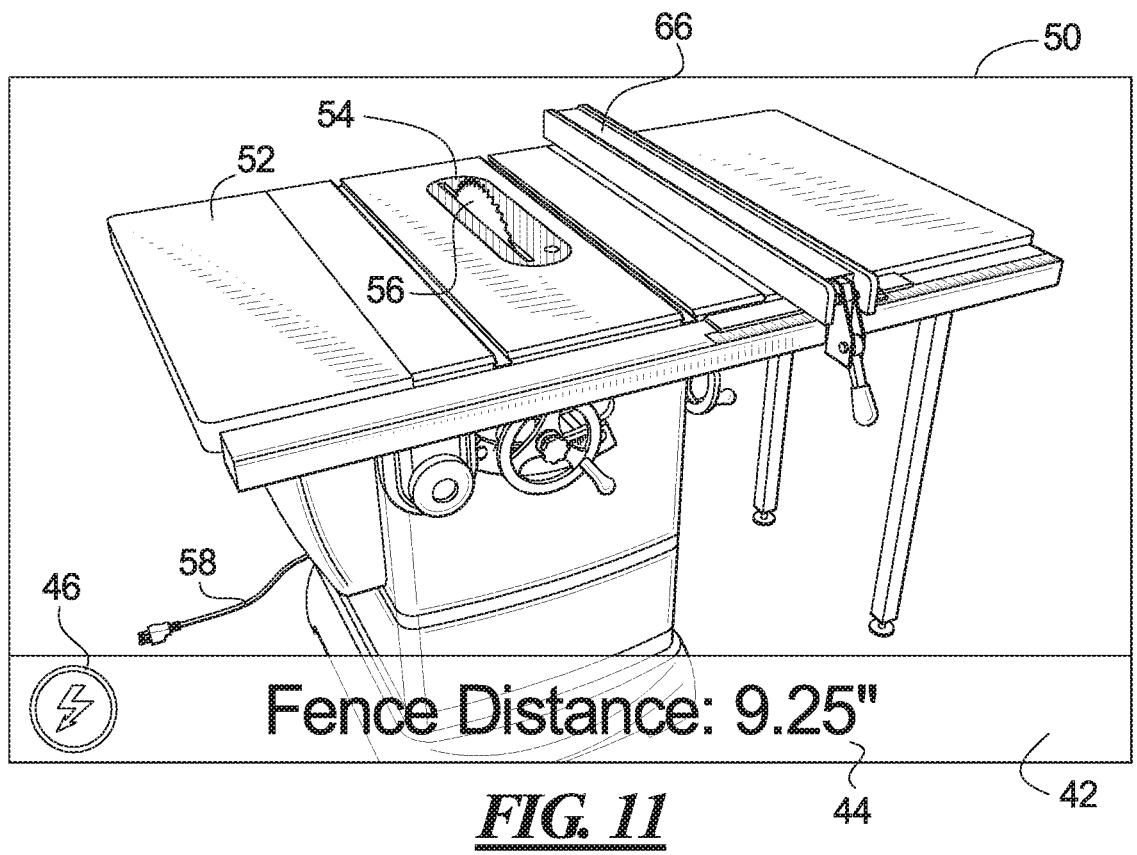
FIG. 11 is a view via the virtual reality device of a tool with projected image information showing a fence distance setting and indicating the blade area.

FIG. 11 shows the tool 52 from another view 50 as the user has moved back from the tool 52. The power icon 46 indicates that the tool is disconnected from power; the power cord 58 can be seen disconnected from power. The user has installed a fence 66 on the tool 52 and has positioned the fence 66 on the top portion 62 relative to the blade 56 so that a work piece may be moved along the fence 66 to provide a defined cutting position of the blade 56. The user has selected the fence position as the information displayed at 44. In the example, the fence position is reported as "fence distance: 9.25 inches" as machine information displayed in the lower band 42 of the display 55. As the fence 66 is adjusted to different positions from the blade 56, a sensor in the tool 52 senses the fence position and the displayed distance is updated. The area 54 around the blade 56 is highlighted in this view.

Figure 12:
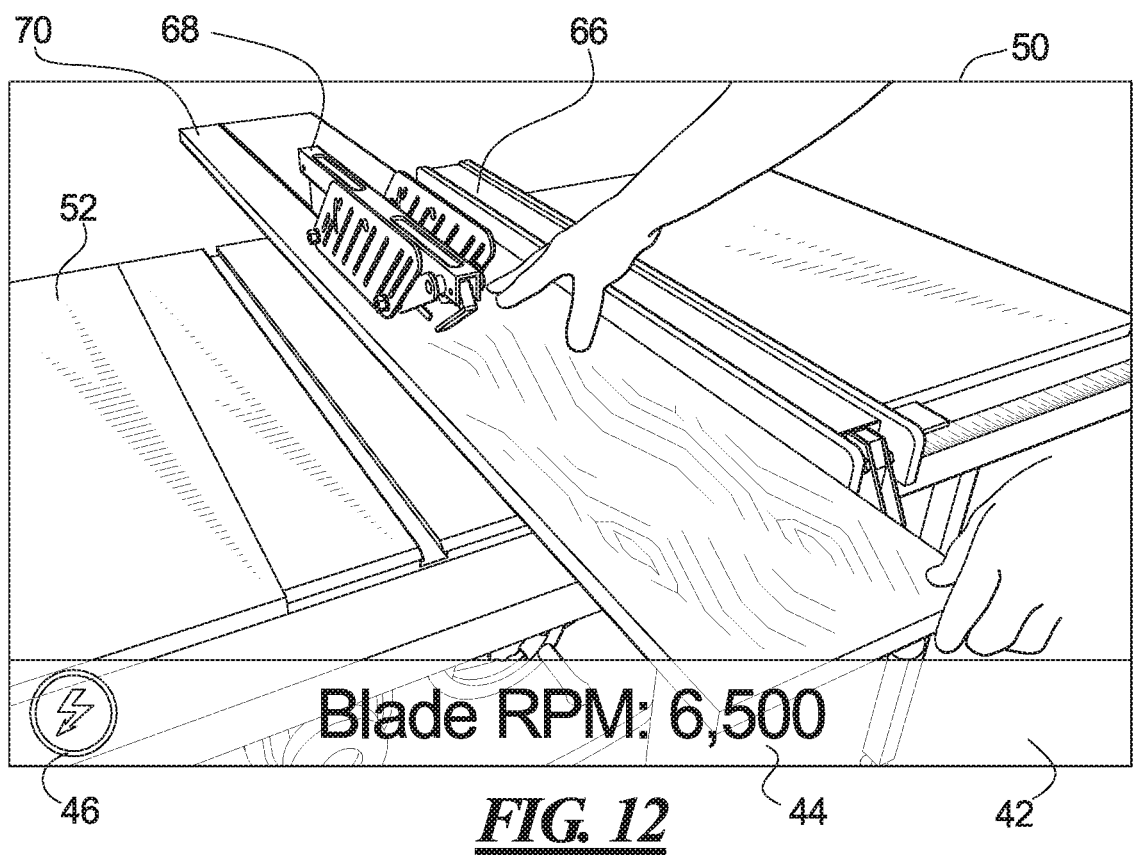
FIG. 12 is a view via the virtual reality device of a tool with projected image information showing the blade speed setting of the tool.

Another view is provided in FIG. 12. In this view 50, a blade guard 68 has been mounted over the blade 56 and a work piece 70 in the form of a piece of wood lumber is being cut with the table saw 52. The area 54 is no longer highlighted in the view 50. For example, the placement of the blade guard 68 over the blade 56, as determined by a sensor, may cause the device 26 to halt the display of the highlighted area 54. The saw blade 56 is running, as indicated by the dark green power icon 46.

The information shown in the band 42 across the lower portion of the augmented reality overlay device view 50 has been changed, either by the user or automatically, to indicate the tool speed. Here, the information display 44 reports that the blade speed is "Blade RPM: 6,500" as sensed by a sensor. The wearer can monitor the tool speed, and more particularly any changes in the tool speed, during use of the tool and requiring that the user look away from the work piece 70. For example, if the user moved the work piece too quickly toward the blade 56 or if the blade 56 encounters an especially dense part of the work piece 70, the tool speed will slow. The user may wish to slow the movement of the work piece 70 toward the blade 56 to permit the tool speed to return to a desired operating speed. The user need not look to a separate display for the tool speed information, for example, but may keep their eyes on the work piece.

Figure 13:
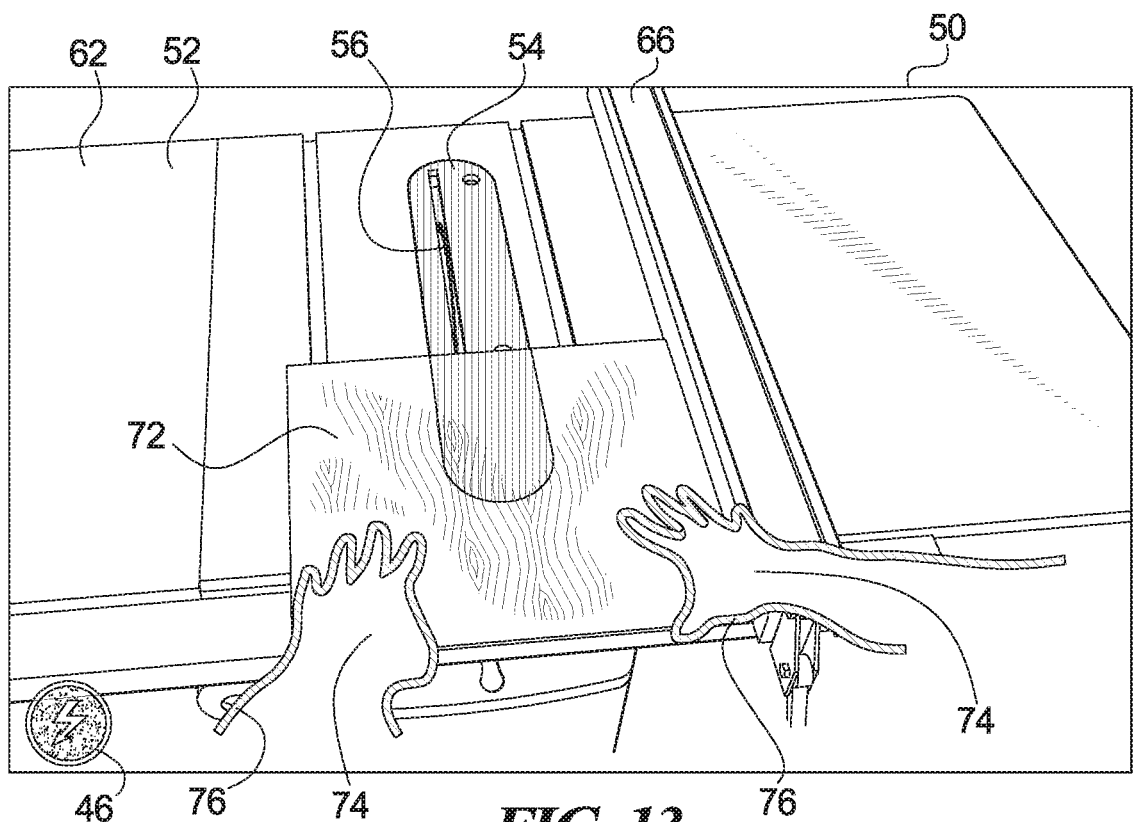
FIG. 13 is a view via the virtual reality device of a tool with projected image information indicating the blade area and indicating the position of the user's hands.

The augmented reality overlay device 26 may sense and highlight objects in addition to the tool 52 or portions thereof. In FIG. 13, the tool 52 is seen in the view 50 of the augmented reality overlay device 26 from the wearer's view point. The blade area 54 is highlighted in red by a projected image overlaying the view of the saw blade 56 in the wearer's view. The highlighted area 54 indicates that the blade 56 represents a caution or danger zone. The blade highlight 54 may be provided when the tool 52 is operated without the blade guard 68 or the highlight 54 may also be displayed while the blade guard 68 is mounted on the tool 52. Use of the tool 52 without the blade guard 68 is not recommended. A work piece 72 in the form of a panel or sheet that has been formed of wood chips, also known as particle board, pressed wood or chip board is to be cut using the table saw 52. The work piece 72 is placed on the top portion 62 against the fence 66 and moved into contact with the blade 56 as the blade is running at operating speed. The blade highlight area 54 is shown projected onto the tool 52 around the blade 56 and onto the work piece 72 where the work piece 72 has been moved into the highlighted area 54. As a resulted of the projected area 54, the wearer is kept aware of the blade 56 and the area around the blade 56, even when the area 54 is covered by the work piece or obscured by other objects.

Also visible in FIG. 13, the augmented reality overlay device 26 senses the position of the wearer's hands 74 and provides projected highlights 76 onto the wearer's hands 74 and possibly also onto the arms. Here, the wearer's hands 74 and arms are provided with a highlight 76 outlining each of the wearer's hands 74 in a highlight color. The highlight color 76 in the example is bright green, which distinguishes the hands highlight 76 from the blade highlight 54 in red. The hands highlight 76 in this example are provided as an outline only instead of a solid highlight over the hands. The outline changes in shape and position as the wearer moves his or her hands 74 in the view 50 of the augmented reality overlay device 26. Other colors and/or indicators may be provided as well.

Figure 14:
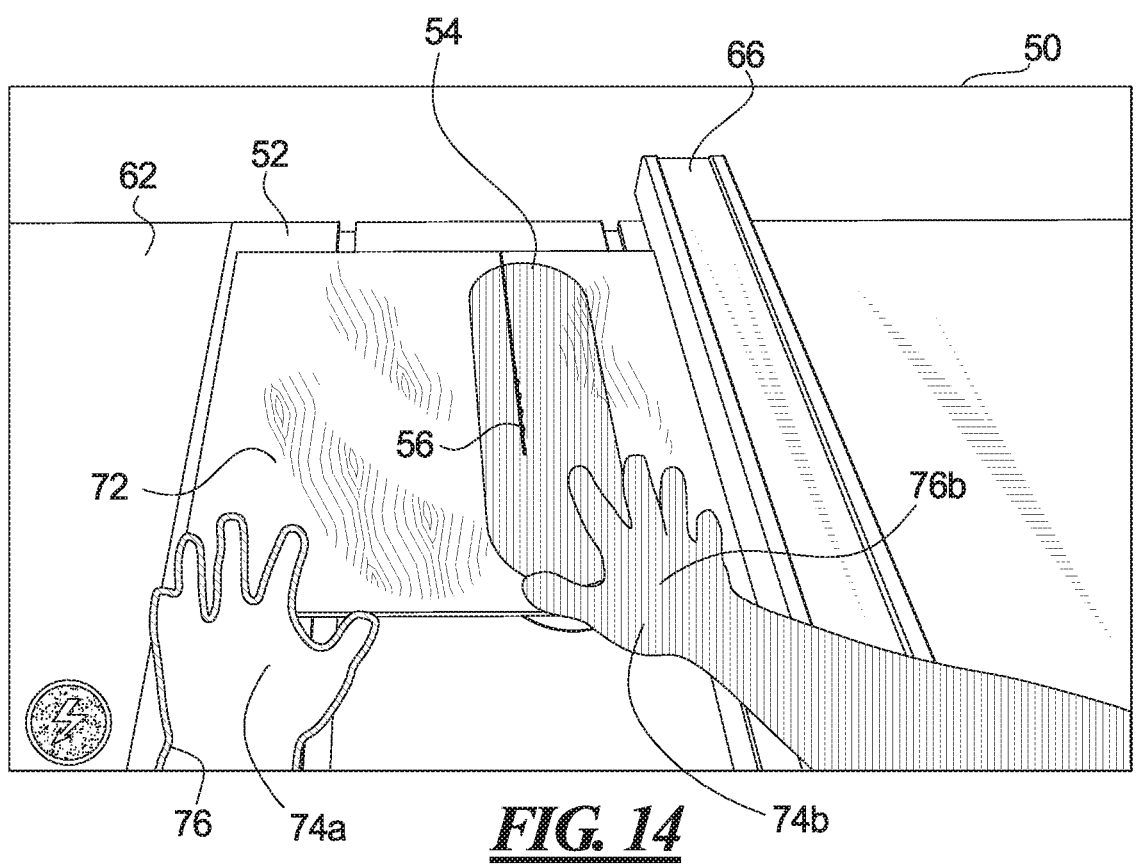
FIG. 14 is a view via the virtual reality device of a tool with projected image information indicating the blade area and indicating that one of the user's hands has moved into the blade area.

With reference to FIG. 14, the cut into the work piece 72 has continued from the view of FIG. 13. The blade highlight 54 remains over the area of the blade 56, even though the blade area of the tool is completely covered by the work piece 72. The wearer's hands 74 are also still outlined in a highlight 76. The wearer's left hand 74a is supporting the work piece 72 at a safe distance from the blade area 54, and so remains outlined in a green highlight 76. For purposes of demonstration only, the user's right hand 74b is at a position on the work piece 72 where a part of the user's hand has contacted or entered the blade zone 54. The image projection device 26 senses the intrusion of the wearer's hand into the blade zone and upon sensing the intrusion changes the highlight 76 on the intruding hand 74b. The highlight 76b over the wearer's right hand 74b has been changed from a green outline to a solid red highlight over the wearer's hand. The change in the color and shape of the highlight 76b alerts the wearer that their right hand 74b has moved too close to the blade 56 of the tool 52. The highlight 76b is transparent so that it does not obscure the wearer's view of the hand 74b. The blade zone 54 is set to be sufficiently large that the wearer's hand 74b has not come into contact with the blade 56 so that injury is avoided by the warning to the wearer. The change in the highlight color and shape reduces the risk of injury. The blade area 54 may be set to different sizes and shapes, depending on the tool, the type of work being done, the experience of the wearer, or other factors. The highlight 76 warning the wearer of encroachment in the blade area 54 may flash, turn on and off, change colors or patterns or otherwise attract the wearer's attention to an encroachment of the wearer's hand or other body part into an area of a tool to be avoided.

Figure 15:
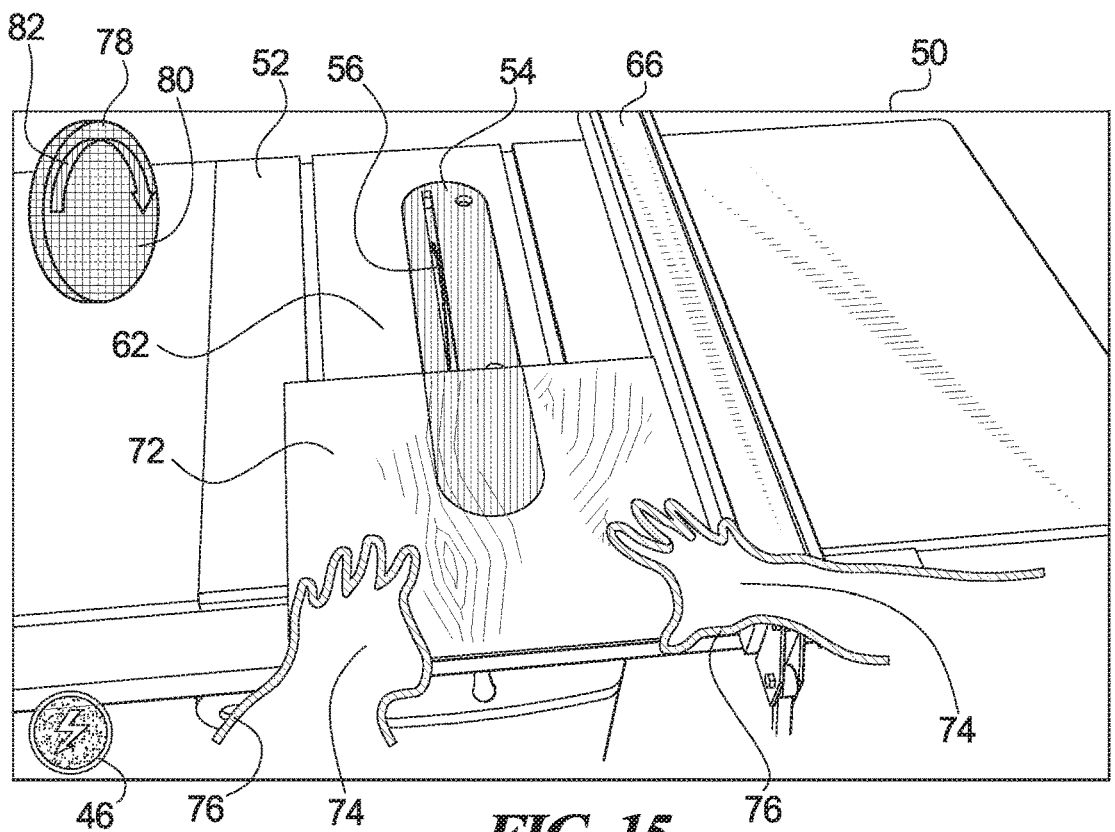
FIG. 15 is a view via the virtual reality device of a tool with projected image information including a blade area indicator, hand position indicators, and a virtual control for another tool.

FIG. 15 shows a view 50 through the device 26 of the tool 52 as the wearer is moving a work piece 72 toward the blade 56. The blade area 54 is highlighted and the wearer's hands 74 are outlined in a highlight 76 of a different color. In this example, a virtual control 78 is provided by projecting an image in the view 50. The virtual control 78 is a projected image in the upper left corner of the wearer's view 50 that, in this example, indicates an area and a direction. In a certain example, a yellow oval 80 is shown with a red arrow 82 indicating a clockwise direction. The control 78 represents a knob that may be turned to perform a function, such as controlling the speed of the blade or another function of the tool 52, of another tool, of the wearable image projection device 26, or the like. The control 78 may be operated by the wearer by moving one of the wearer's hands 74 to the area of the control 78 and by moving the wearer's hand 74 in the direction indicated by the arrow 82. For example, the wearer may move his or her left hand 74a to the yellow oval area 80 at the upper left of the view 50. The wearer then moves his or her hand 74 in a clockwise motion to activate the control 78. Multiple virtual controls may be provided within the view 50, either simultaneously or sequentially, or both, to control functions of the tool or other functions. The augmented reality overlay device senses the position and motion of the wearer's hand 74 at the area of the controls and wirelessly or by wired connection sends a signal to perform the function of the control.

In certain examples, the virtual control 78 operates another tool. For example, a dust collector device may be connected to the table saw 52 to collect sawdust while the saw 52 is operating. The virtual control 78 enables the wearer to turn on and adjust the operating speed of the dust collector device while the wearer is at the saw 52 and without the wearer needing to move away from the saw 52 or to take the wearer's eyes off the work piece 72 that is being cut by the saw 52. For example, if the operating speed of the dust collector is insufficient to handle the volume of sawdust being generated by the saw 52, the user may increase the operating speed of the dust collector while using the saw 52 to cut the work piece 72.

The virtual control may control operating characteristics of the tool being viewed by or through the augmented reality overlay device or may control operating characteristics of tools or other devices that may be in the same work shop but not visible in the field of view. The augmented reality overlay device may be set to display virtual controls for associated equipment that may be used with the tool in use. A common associated device may be a dust collector, that can be connected to work with sanders, planers, saws, drills, lathes and other tools. Other devices are also possible.

Figure 16:
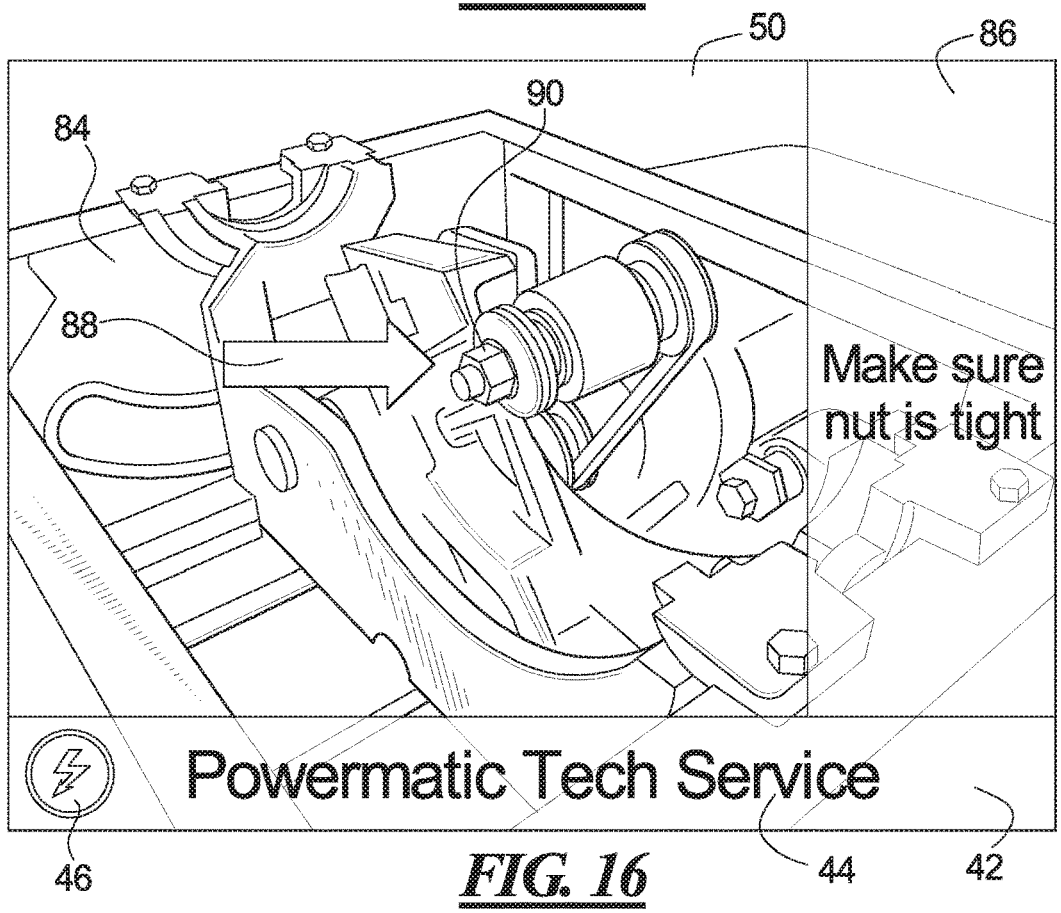
FIG. 16 is a view via the virtual reality device of a tool with projected image information including instructions for operating the tool.

With reference to FIG. 16, the augmented reality overlay device 26 may be used during assembly, adjustment, servicing, troubleshooting, disassembly, and other operations involving a tool 84. For example, a virtual reality guide 86 to assembly of the tool 84 may be provided to the wearer to ensure proper and timely first time assembly of the tool 84. Servicing of the tool 84 may be guided by the augmented reality overlay device 26. In the illustration, the wearer has selected the technical support function for the augmented reality overlay device 26, as indicated in the band 42 across the bottom of the view 50. The wearer is viewing a portion of the tool 84 that requires adjustment. The augmented reality overlay device 26 displays a projected arrow 88 positioned to indicate a part of the tool 84 to which the wearer's attention is directed. In this example, a nut 90 on the tool 84 is indicated by a projected red arrow 88. In the panel 86 to the right side of the view of view 50, a pale orange highlighted background is provided with the text instruction to the wearer to "make sure the nut is tight." The device 26 has sensed the identification and position of the nut 90 and has displayed the corresponding instruction relating to the identified part to the user. In this way, a wearer of the device 26 may be guided through the assembly, adjustment, servicing, or operation of the tool 84. The power status icon 46 indicates that the tool 84 is without power.

Other indicators, highlights, instructions, and image elements may be provided using the device 26 to guide the wearer through assembly, adjustment, servicing, troubleshooting and disassembly of the tool. The technical support guidance via the augmented reality overlay device 26 may be provided automatically by the device 26 following a wearer initiation of the assistance operation. Alternatively, the device 26 may be connected to a support or service center or other resource, which transmits servicing instructions to the augmented reality overlay device 26 at the instruction of technical support personnel for the tool 84.

Figure 17:
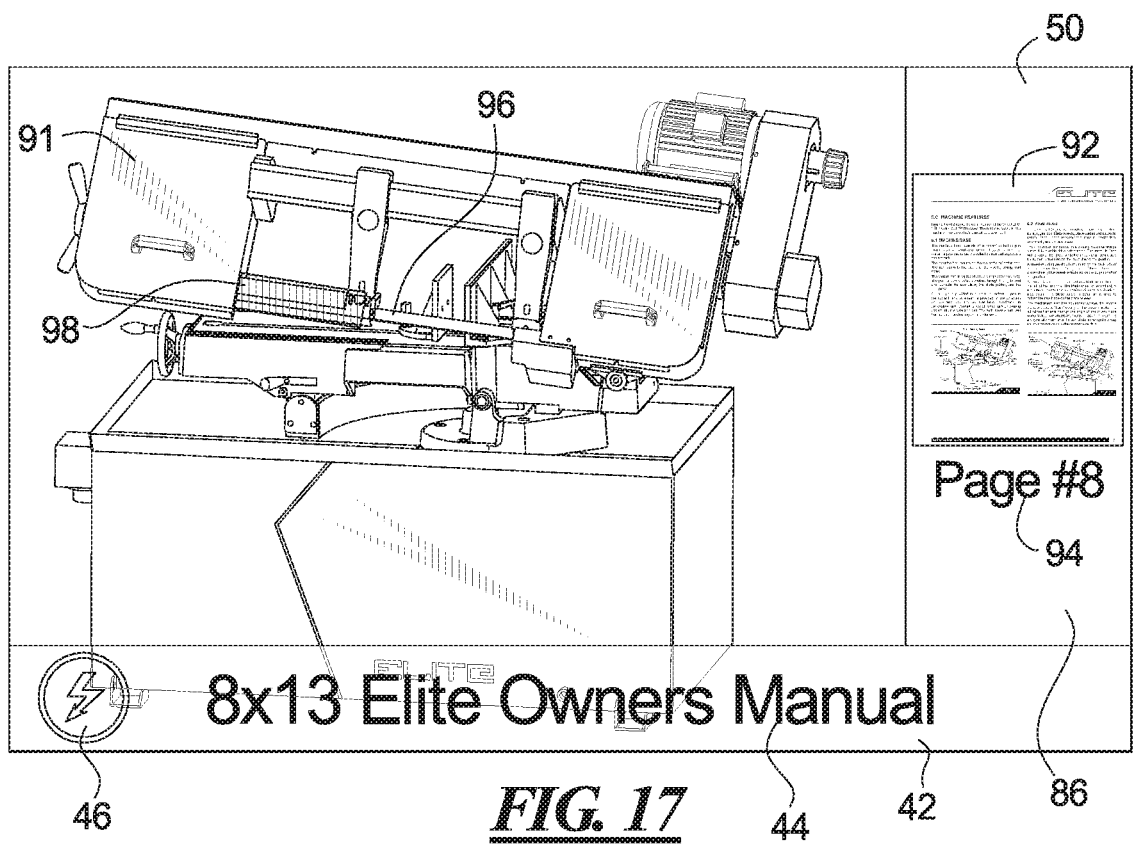
FIG. 17 is a view via the virtual reality device of a tool with projected image information including information from an operating manual for the tool.

FIG. 17 provides a view 50 of another tool 91 via the augmented reality overlay device 26. The tool 91 in the illustrated example is a band saw. The wearer is shown a user's manual, or owner's manual 92, for the tool. The manual 92 is available for viewing via the augmented reality overlay device 26. Here, the wearer has selected the user's manual 92 from the function selection, as indicated by the band 42 across the bottom of the screen 50. The wearer is viewing the tool 91 in a particular position, here with the band saw configured to cut in the horizontal position. The augmented reality overlay device 26 has used its cameras to identify the configuration of the tool 91 and the portion of the tool 91 being viewed by the wearer and has displayed a corresponding page of the owner's manual 92 that relates to this configuration and portion in the panel 86 at the right side of the view screen 50. In this example, the augmented reality overlay device 26 indicates that information on operating the band saw 91 in the viewed position may be found on page 8 of the manual 92, as indicated at 94. The image of the manual page 92 in the augmented reality overlay device 26 may be too small for reading the text found there at this display size, but the wearer may use the displayed information to identify the page of the manual to be viewed for this information. The wearer may access the manual as a paper or electronic copy or may enlarge the view of the page on the device 26 for reading and viewing of the details shown therein.

As the wearer views different portions and configurations of the tool 91, different pages of the manual 92 are displayed thereby guiding the wearer to the desired information. For example, the band saw may be configured for vertical operation, which would be recognized by the device 26 and the corresponding pages of the operations manual would be displayed. The blade 96 of the band saw 91 is highlighted in a color zone or area 98 to indicate the area of possible risk to the wearer. The zone or area 98 is a projection of transparent red by the augmented reality overlay device 26 in the example.

Figure 18:
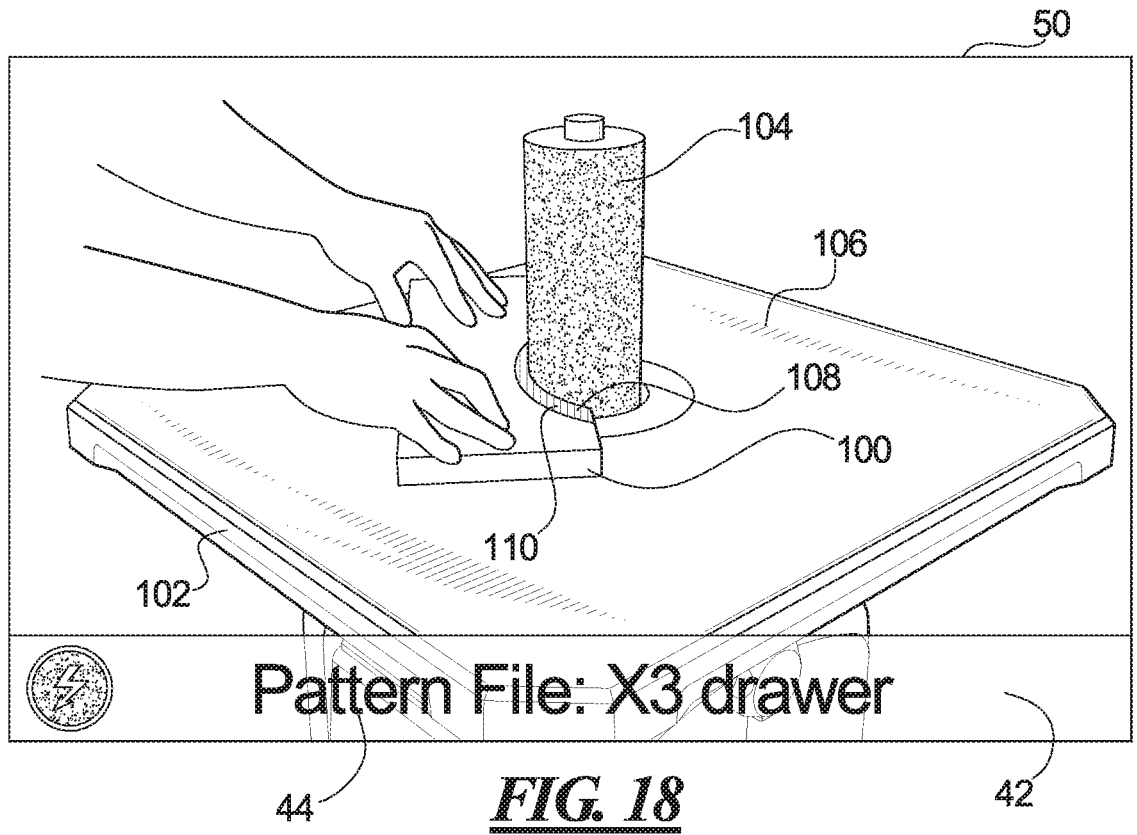
FIG. 18 is a view via the virtual reality device of a tool with projected image information including pattern overlay information and a material removal indicator for a work piece.

FIG. 18 shows an example of a work piece 100 that has been detected by the augmented reality overlay device 26 while the work piece 100 is being worked by a tool 102. In the illustration, the tool 102 is a spindle sander having a vertically disposed sanding drum 104 extending from a work table 106. The wearer is using the spindle sander 102 to shape a part for the project. The wearer has selected the project in the control for the device 26, for example from a menu, and has selected the part 100 that is currently being shaped for that project. For example, the user may have selected a pattern file as shown at the information display 44 for the project, as indicated in the band 42 at the lower portion of the screen. The augmented reality overlay device 26 senses the size, shape and position of the work piece 100 and determines by comparing the pattern file to the sensed shape of the work piece 100 that a portion 108 of the work piece 100 requires working by the tool 102. In particular, the portion 108 should be shaped or removed to as a step in the project. The augmented reality overlay device 26 highlights the portion 108 to be shaped or removed using a projected transparent color 110 on the portion 108. The projected transparent color highlight remains on the portion 108 regardless of the orientation of the work piece 100 in the view 50. The augmented reality overlay device 26 sense when the material shaping or removal is complete and remove the projected highlight from any areas that have been shaped the desired configuration.

In the illustrated example, the inside curved surface 108 of the work piece 100 is to be shaped by the tool 102 as indicated by the highlighted 110. Material is to be removed from the inner curved portion 108 of the wood work piece 100. The augmented reality overlay device 26 may have determined the location of the material to be removed by comparing a plan view of the work piece with an electronic representation of the desired work piece. The user may remove some material and then move the work piece 100 to provide the augmented reality overlay device 26 with another plan view to determine if enough material was removed or if further material should be removed. Different areas may be highlighted as needed. It is also possible that the augmented reality overlay device 26 determines if material should be removed while it is being worked or from other orientations. The augmented reality overlay device 26 may instruct the user to move the work piece to particular orientations for the determination.

The work piece 100 is shaped by removing a portion 108 highlighted in red at 110. The wearer uses the tool 102 to remove the material from the work piece 100 until the red portion 110 is no longer shown in the augmented reality overlay device 26. The resulting work piece 100 is at the desired shape as indicated by the pattern.

The pattern may indicate the assembled finished product with each piece highlighted, for example as it is being formed. Other highlighting and indications are provided within the scope of this invention.

Figure 19:
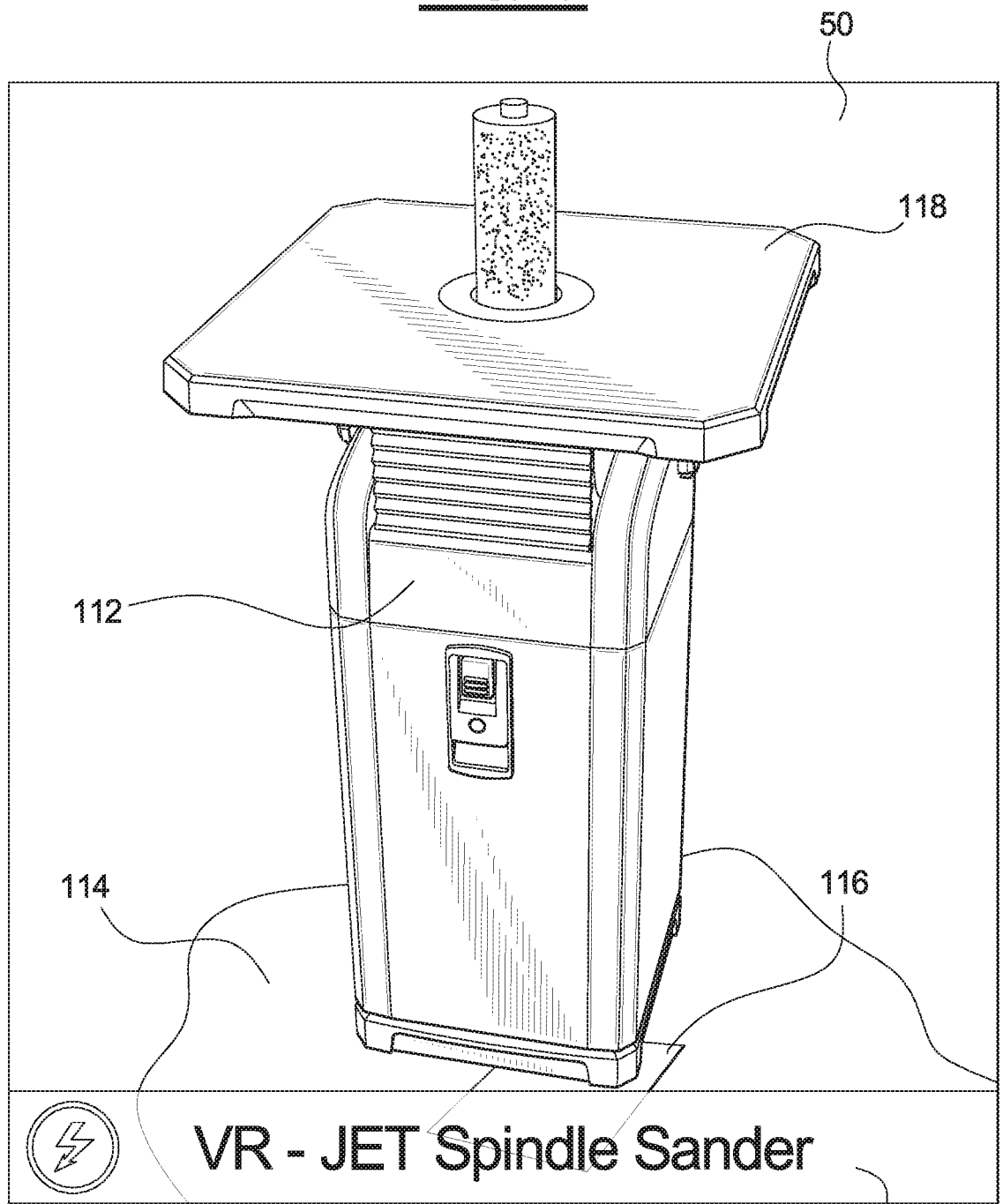
FIG. 19 is a view via the virtual reality device of a tool with projected image of a virtual tool.

Turning to FIG. 19, the wearer of the augmented reality overlay device 26 may be considering an acquisition of a new tool 112 for a work area 114, or may be considering where to locate a recently acquired tool 112 or where to move a tool 112 to in a reorganized or rearranged work shop 114. The augmented reality overlay device 26 may be capable of displaying a virtual representation of the tool 112 in the view 50. An indicator or target 116, such as a copy of a promotional brochure or owner's manual for the tool 112, a page from the brochure or manual, or a separate page or other indicator, may be placed at a location in the work shop 114, for example, at a location where the user wishes to place the tool 112. The tool 112 may be selected from a menu in the augmented reality overlay device 26 or the indicator or target 116 may include information by which the augmented reality overlay device 26 detects the tool type and automatically selects the tool 112. The tool 112 selected, either manually or automatically may be displayed by name in the band 42 at the lower portion of the view 50.

The augmented reality overlay device 26 displays an image 118 of the selected tool 112 at the location as indicated by the indicator or target 116. The image 118 of the tool 112 may be generated as a 3D image corresponding in size and shape to a physical example of the tool 112. The wearer may view the virtual image 118 of the tool 112 from multiple viewing positions in a possible installation location without the need to move the physical tool to that location. The wearer may be able to consider the size and shape of the tool 112, interference of the tool 112 with other actual or virtual tools or items in the work area 114, or other positioning issues without physically locating the tool at the location.

Using additional targets or indicators 116 for other tools, including tools of the same type or tools of other types or other items that may be used in a work area, the augmented reality overlay device 26 may display a plurality of tools arranged as determined by the positioning of the indicators or targets 116. The wearer may be able to arrange and rearrange the tools and other items in the work area in a way that best fits, that facilitates use of the tools, that avoids interference between tools, provides easy access, facilitates a work flow in the work area, provides clearance for access or egress to and from the work area, provides storage room for materials, tools or parts, or for other reasons. For example, a user may wish to connect a dust collecting apparatus to several material working tools, such as saws, sanders, grinders, or the like. The indicators or targets 116 may be positioned to provide for connection of dust collecting hoses between the dust collecting apparatus and the material working tools. Using the targets 116 and the augmented reality overlay device 26, the wearer may visualize a partial or completed work shop 114 before the tools 112 are installed.

The wearable projection device 26 may be operable to place a virtual image 118 of equipment in a work shop before the equipment is purchased. According to the present method and apparatus, a virtual image 118 of a tool may be projected by the wearable projection device 26 at a location so that the wearer may determine the fit of the tool at the location. Items in a product catalog may be virtually placed in a shop 114 or other location using the wearable device 26. Prospective buyers of tools may be able to choose tools from a catalog that could be visualized as virtual images 118 of the tools sitting in their shop at home or other location.

Figure 20:
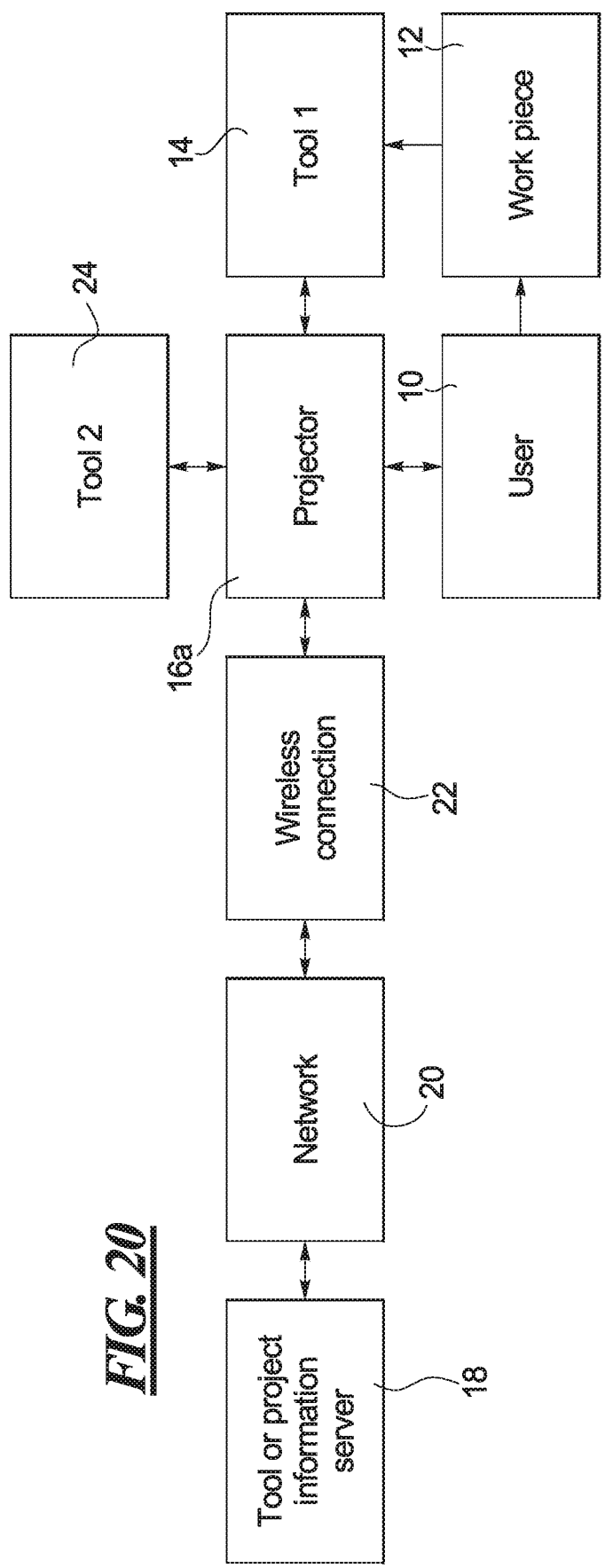
FIG. 20 is a functional block diagram of an image projection system used with a tool.

FIG. 20 provides an example where an augmented reality overlay device is not worn by the user but instead includes a projector 16a such as a laser projector or other projector that projects a light image onto the work piece or onto the tool or other part. The projector 16a may display tool setting information, work piece information, safety information or other information, similar to that described above. The projector 16a may be mounted in or near the work space to permit projection of image information onto one or several tools 14 and 24. The projector 16a may receive tool or project information from a server 18 that is transferred through a network 20 and through a wired or wireless connection 22 to the projector 16a. The projector 16a may send the position and shape of the tool, of the user's hands or other body parts, of the work piece or other items and project highlights onto the areas as described above for the worn augmented reality overlay device 26.

Figure 21:
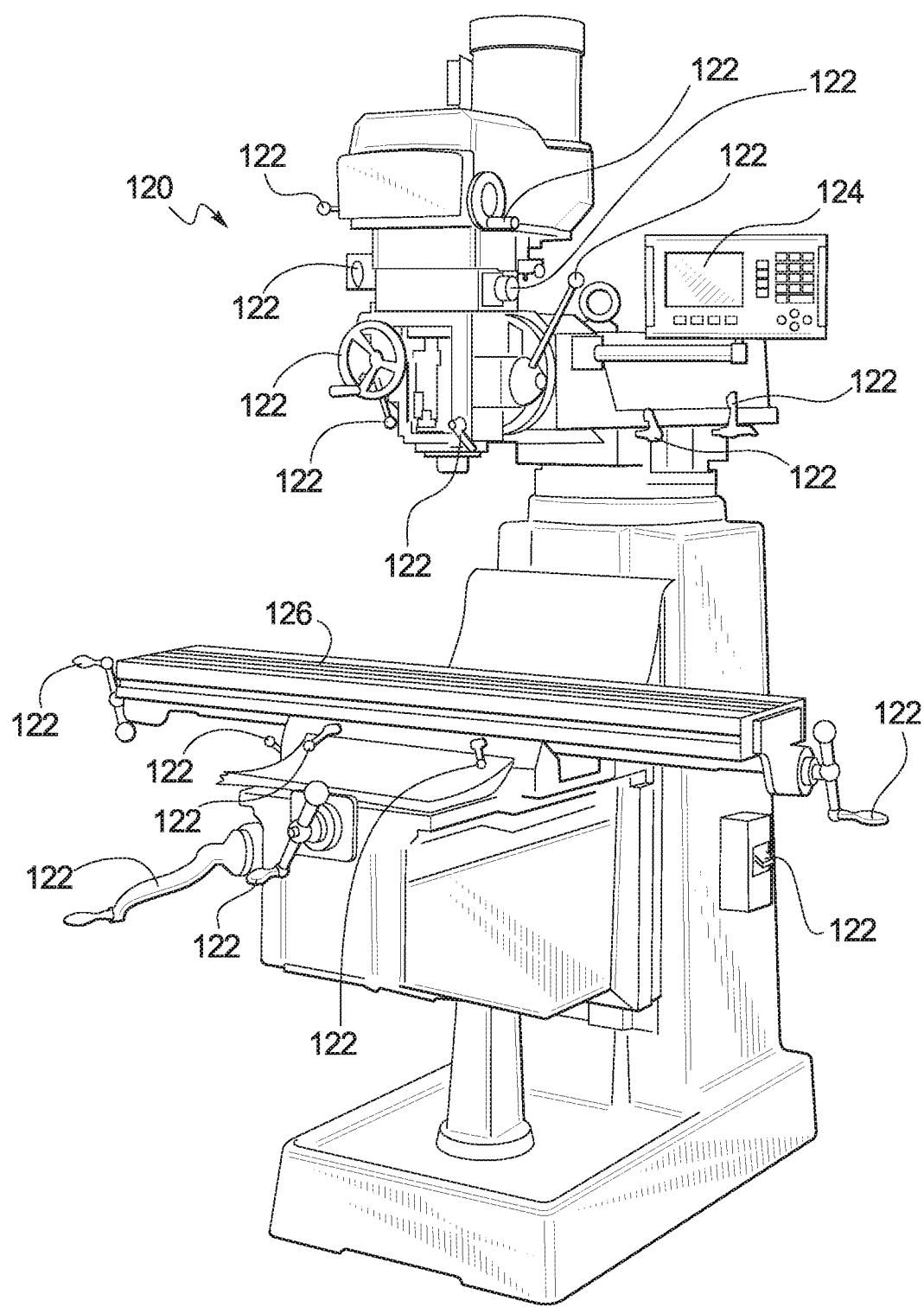
FIG. 21 is a perspective view of a machine tool having a display screen on which is displayed information relating to the use of the tool and the settings to which the tool has been set.

FIG. 21 shows a mill tool 120 for shaping and working a work piece. The mill 120 includes many control and adjustment levers, cranks, wheels, switches, dials, and other control and adjustment devices 122 that may be adjusted by the user. The mill tool 120 also includes sensors that sense the position and configuration of the mill tool as the control and adjustment devices are operated and that display the sensed position and configuration information on a display screen 124. The illustrated mill tool 120 includes a work table 126 on which a work piece is mounted for being worked.

A user setting up the mill tool 120 for operation and adjusting the position and configuration of the mill tool 120 and a work piece on the work table 126 for being worked may refer to the displayed sensor values on the screen 124. To make such adjustments, the user typically looks at each control and adjustment device 122 being adjusted and grasps or otherwise operates the control and adjustment device. The user typically looks at the display screen 124 to determine the values output by the sensors. Many users watch the tool components as the adjustments are being made, and watch the work piece during the adjustment process. Users typically also look to the display screen 124 for the sensor values that are changing during the adjustment process. The result is that the user repeatedly looks back and forth between the workpiece and the display screen 124, or back and forth between the control and adjustment devices and the display screen 124, or back and forth between the mill tool 120 components and the display screen 124. The setup and adjustment of the mill tool is often characterized by repeated looking back and forth between the tool and the display screen 124.

Figure 22:
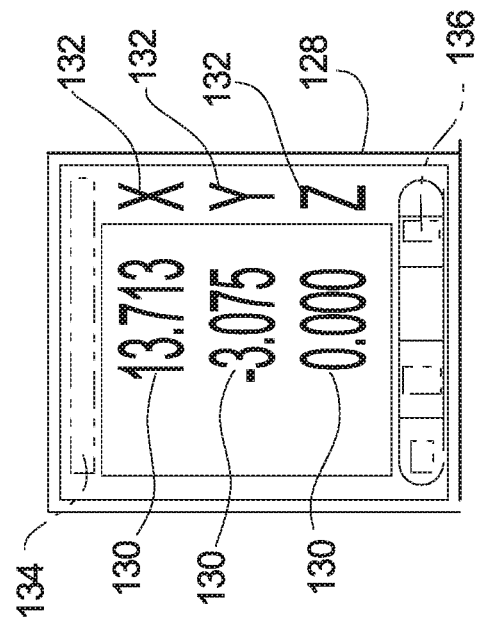
FIG. 22 is a view of a portion of the machine tool through a virtual reality device, showing tool information including setting information to a user while viewing the machine tool.

In FIG. 22 is shown a projected image 128 that may be projected by the augmented reality overlay device 26. The projected image 128 may include any desired information that would be displayed on the display screen 124, for example, of the mill tool 120 of FIG. 21 or other tool. The projected image 128 of the illustrated example includes values 130 of X, Y, and Z positioning of the tool or work piece as indicated by the value labels 132. Other values may be displayed in addition or instead of the position values. The projected image 128 is transparent or translucent and projected into the field of view of the wearer of the augmented reality overlay device 26 so that the position values or other information is seen by the wearer as the wearer looks at the work piece and the control and adjustment devices 122. It is no longer necessary for the user to repeatedly look back and forth between the display screen 124 and the tool or work piece. Precise positioning and adjustment of the tool 120 and work piece are possible with, for example, less risk of damage as a result of the user watching the display screen 124 during an adjustment and inadvertently impacting the work piece with the tool. Those of skill in this art will recognize many other advantages of being able to see the sensor values while watching the tool or work piece.

Other information 134 and 136 may be displayed by the projected image 128. The user may select the displayed information 130 and 132 that is shown in the projected image 128, or the display may automatically change to show values 130 that are being adjusted by the control and adjustment device 122 being operated by the user.

Other tools may be used with the augmented reality overlay device 26 to show tool settings, to highlight tool parts, highlight user body parts, or highlight workpiece parts, to provide tool power status or position information, to provide instructions and guidance, to provide virtual controls for the tool, to provide virtual images of one or more tools or parts thereof, or to otherwise provide information relating to the tool in the field of view of the wearer. Other uses are also possible and within the scope of the present invention.

In certain embodiments, the wearable projection glasses have a camera incorporated into the glasses. The camera is operable to capture and share image information, including video image information or still image information, of work being done on a work piece. A wearer who is working on a project may record the process or may transmit image data of the process, such as to others seeking to do the same or a similar project. For example, a wearer may use a lathe to turn an intricate bowl while obtaining video data of the process or a craftsman preparing an object of art may use the wearable image device to capture image data of the process. Image data of any part process may be obtained.

In certain embodiments, the image projection device shows the tool or machine status in view. The displayed information indicates if the tool is powered on, stopped, or running. The status information is similar to a stack light on a machine.

In certain embodiments, a machine tool is provided with a display which may include a numeric display or a display screen. Examples of tools that may be provided with such displays include mills, lathes and other material working tools as well as other tools and devices. The display may show settings of the tool as information read from one or several sensors.

Similar to the Smart Sand operating method for power sanders, the present method and apparatus may provide motor feedback to the user to indicate to the user that they are applying too much pressure on the tool or that the feed rate for the work piece is too high. Tools such as sanders, saws, band saws and other tools my link the motor speed information received from the tool to the feed rate information obtained via object sensing by the projection device and may notify the user when the user is applying too much pressure to the work piece. In certain embodiments, a detected speed change and feed rate may indicate that the blade is dull and needs to be changed, which may be indicated to the user by a notification using the information projection device 26.

The present image projection device may use the image sensor capability to identify service parts needed, may display the needed parts to the user on the display, and may allow the user to order the parts via the device.

The image projection system may permit a user to select a project for working on and may provide information to the user via the display relating to work on the project. For example, the project may require cutting of parts and the displayed information may show the user a cut list of parts to be cut. Or the display may show the user an assembly list for users seeking to build a project.

Embodiments of the present invention provide a visualizing system for use with power tools. The power tool may be a band saw, table saw, planer, lathe, sander, drill press, or other work-shop tool.

The visualizing system (virtual reality system) provides one of two possible visualizing devices. One—a heads-up display such as images projected onto Google Glass, Epson glasses, or projected onto safety glasses or a face shield so that the image appears to the user to be projected onto the work area and/or work piece of the tool. Or Two—the visualizing system may instead be a projector, such as a laser projector, that projects images onto the work area of the tool and/or work piece being worked by the tool. With the projector visualizer, the user need not wear the Google Glass, or other heads-up display device.

The visualizing system may sense the positions of articles in the field of view and adjust the display accordingly.

The images being projected by the visualizing system may include:

Projecting images indicating the operating speed and operating condition of the tool, such as operating RPMs or whether the tool is operating in forward or reverse mode. The visualizer receives this information from the tool control system.

Color coded highlights projected onto the dangerous parts of the tool, such as a red highlight projected on the blade or other cutting part and green highlights projected onto the user's hands. The visualizer senses the moving blade and the shape and position of the user's hands.

Warnings that are projected onto the area between the blade and the user's hands if the user gets his or her hands too close to the blade, such as a flashing warning if the user's hands are in a dangerous position. The visualizer senses the relative positions of the blade and the user's hands.

Color coded guides that are projected onto the work piece to show what parts are to be removed by the tool. For example, a piece of wood has red areas projected onto the portions of the wood to be cut off by a band saw. The user removes the red highlighted portions, leaving the desired shape for the finished wood part. The visualizer senses the shape of the work piece.

Additional features may include hands-free operation of the tool, such as voice command to adjust speed of the tool, or sensing the user's hand positions to start or stop the tool.

Other applications of the present invention will be apparent to those of skill in this art. Each such application is encompassed within this invention.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A wearable display system for use with a tool with a moving blade, comprising:
a wearable display device configured for wear by a user, the wearable display device having a transparent view screen operable to display graphical information on the transparent view screen for viewing of the graphical information by the user while the user is viewing through the transparent view screen;
the wearable display device including at least one camera or sensor positioned adjacent the transparent view screen and configured to sense the tool in the field of view of the user, wherein the wearable display device is configured and operable to sense movement of the blade with the at least one camera or sensor and display a highlight corresponding to a predetermined caution zone, a position of the predetermined caution zone based on and associated with the sensed movement of the blade of the tool in the field of view of the user;
the at least one camera or sensor of the wearable display device configured to sense a location of a body part of the user in the field of view of the user;
wherein the wearable display device is configured to send a control signal to the tool modifying operation of the tool when the user's body part enters the predetermined caution zone.

2. A wearable display system as claimed in claim 1, further comprising a data connection on the wearable display device configured for receiving information from a source, the wearable display device being operable to display the information from the source on the transparent view screen for view by the user, wherein the information from the source includes sensor information from the sensors on the tool, and wherein wearable display device is configured to display tool position or speed information on the transparent view screen.

3. A wearable display system as claimed in claim 1, wherein the wearable display device includes at least one housing positioned adjacent the transparent view screen, and the at least one camera or sensor is incorporated into the housing.

4. A wearable display system as claimed in claim 1, wherein the wearable display device is configured to display operating or assembly information of the tool.

5. A wearable display system as claimed in claim 1, wherein the wearable display device is configured to display tool power status information.

6. A wearable display system as claimed in claim 1, wherein the wearable display device is configured and operable to display a highlight zone on a cutting or abrading part of the tool when the cutting or abrading part of the tool is viewed through the transparent view screen.

7. A wearable display system as claimed in claim 1, wherein the wearable display device is configured and operable to display a highlight on a wearer's body part when the wearer's body part is viewed through the transparent view screen.

8. A wearable display system as claimed in claim 7, wherein the highlight displayed on the wearer's body part changes when the wearer's body part intrudes into the predetermined caution zone around a cutting or abrading part of the tool.

9. A wearable display system as claimed in claim 1, wherein the wearable display device is configured and operable to display a virtual image of a tool at a work area when the wearer views the work area through the transparent view screen.

10. A wearable display system as claimed in claim 1, wherein the wearable display device is configured and operable to display a highlight on a portion of a work piece to be worked when the wearer views the work piece through the transparent view screen.

11. A wearable display system as claimed in claim 1, wherein the wearable display device includes an augmented reality overlay device.

12. A method for operating a tool having a moving part, comprising:
viewing the tool through a transparent view screen of a wearable display device;
sensing movement of the moving part on the tool with at least one camera positioned on the wearable display device; and
displaying on the transparent view screen of the wearable display device an overlay corresponding to a predetermined caution zone on the tool and around the moving part of the tool, a position of the predetermined caution zone based on the movement of the moving part when the tool is viewed through the transparent view screen of the wearable display device.

13. A method as claimed in claim 12, comprising:
sensing a location of a body part of a user through the transparent view screen of the wearable display device; and
sending a command signal via the wearable display device to the tool modifying operation of the tool when the user's body part enters the predetermined caution zone associated with the tool.

14. A method as claimed in claim 12, comprising:
viewing a highlight on a portion of the tool representative of the predetermined caution zone while viewing the tool through the transparent view screen.

15. A method as claimed in claim 12, comprising:
viewing a highlight on a wearer's body part while viewing the tool through the transparent view screen.

16. A method as claimed in claim 12, comprising:
viewing operating or assembly instructions for the tool on or adjacent to the tool while viewing the tool through the transparent view screen.

17. A method as claimed in claim 12, comprising:
viewing a virtual image of a tool in a work area while viewing the work area through the transparent view screen.

18. A method as claimed in claim 12, comprising:
viewing a highlight on a portion of a work piece while viewing the work piece through the transparent view screen.

19. A method as claimed in claim 12, comprising:
viewing a virtual control for the tool on a transparent view screen; and
operating the tool using the virtual control.

* * * * *